Aug. 23, 1966  G. J. H. SAUSELE ET AL  3,268,161
AUTOMATIC TYPOGRAPHIC COMPOSING
Filed July 31, 1963  16 Sheets-Sheet 1
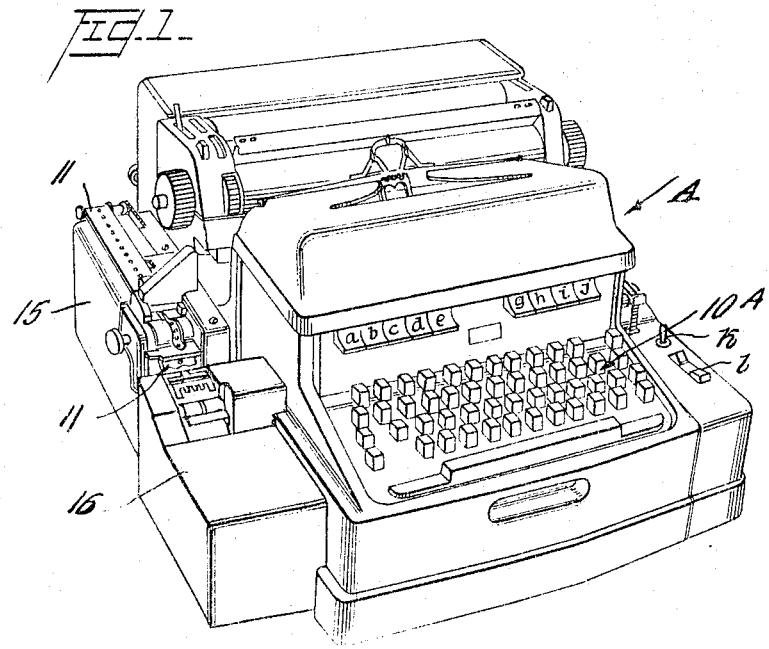
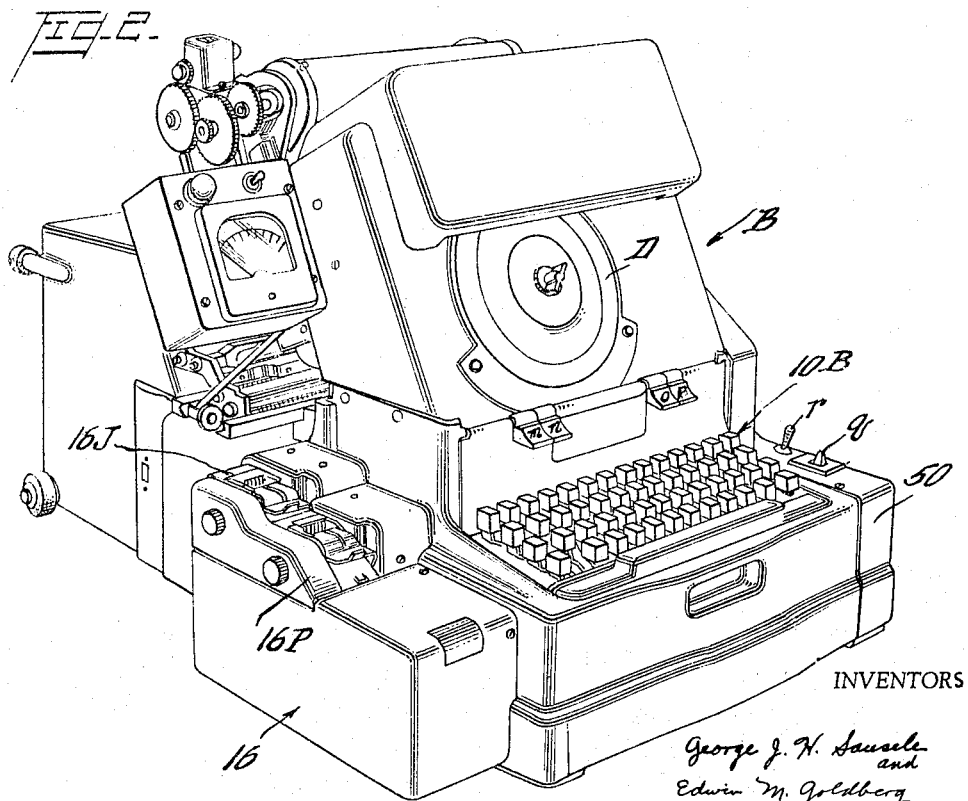
INVENTORS
George J. H. Sausele
and
Edwin M. Goldberg
BY Watson, Cole, Grindle & Watson
ATTORNEYS

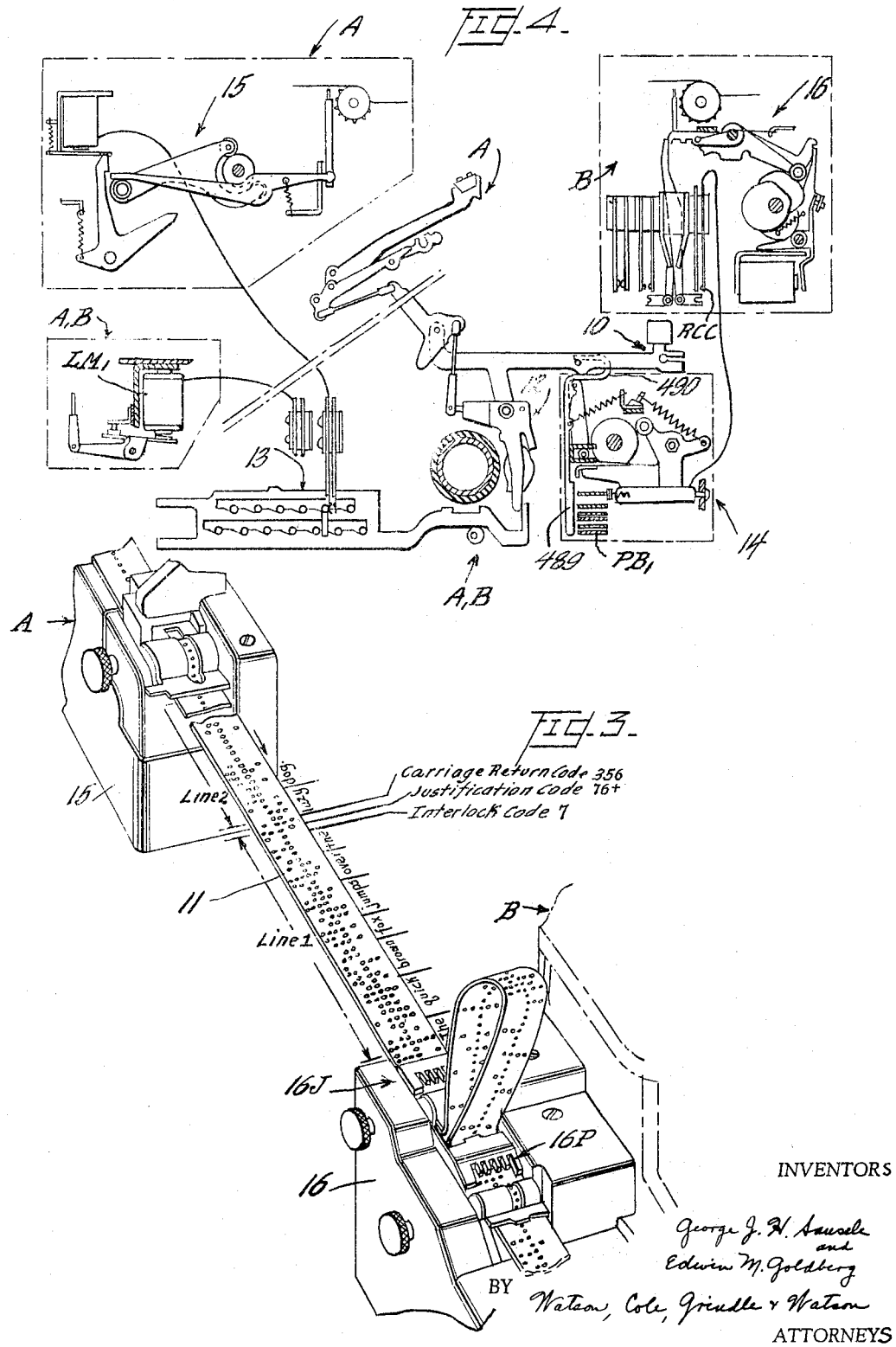

Aug. 23, 1966    G. J. H. SAUSELE ET AL    3,268,161
AUTOMATIC TYPOGRAPHIC COMPOSING
Filed July 31, 1963    16 Sheets-Sheet 3

| | SPECIFICATIONS Cotton Rope and Braided Sash Cord | | | | | |
|---|---|---|---|---|---|---|
| | Braided Sash Cord | | | Rope | | |
| Size | Diameter | Length Per Pound | Breaking Strength | Diameter | Length Per Pound | Breaking Strength |
| 6 | 6/32 | 66 | 225 | 1/8 | 200 | 120 |
| 7 | 7/32 | 51 | 272 | 3/16 | 90 | 250 |
| 8 | 8/32 | 40 | 328 | 1/4 | 52 | 420 |
| 10 | 10/32 | 27 | 440 | 3/8 | 23.5 | 890 |
| 12 | 12/32 | 19.5 | 560 | 1/2 | 13.5 | 450 |

LINE 1
LINE 2
LINE 3
LINE 4
LINE 5

SPECIFICATIONS

Cotton Rope and Braided Sash Cord

Braided Sash Cord                         Rope

Size | Diameter | Length Per Pound | Breaking Strength | Diameter | Length Per Pound | Breaking Strength

FIG. 6

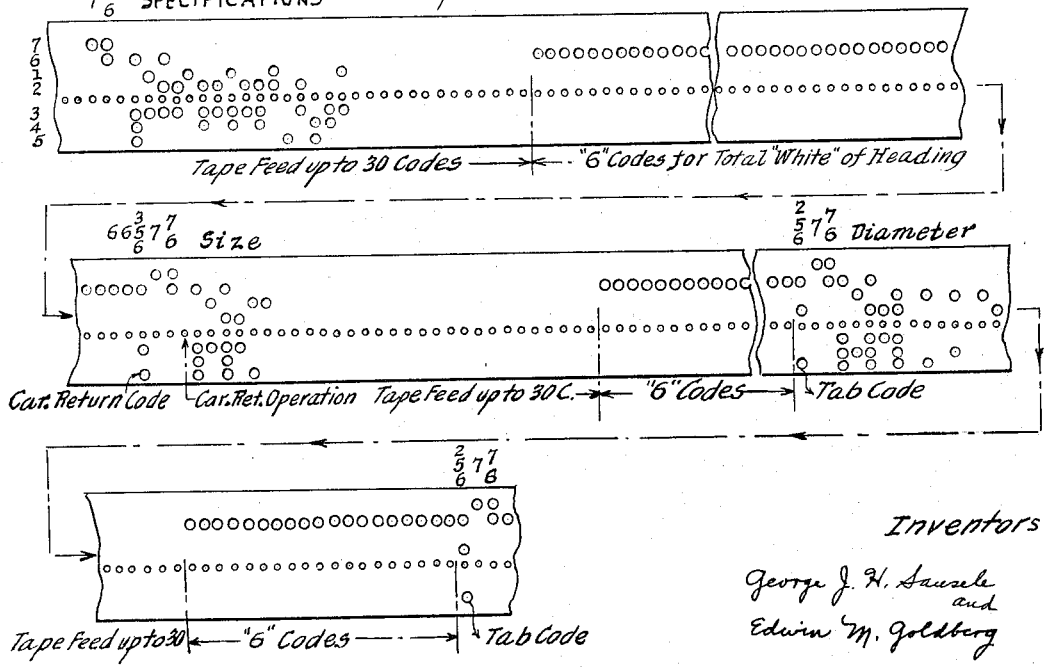

FIG. 7

Inventors
George J. H. Sausele
and
Edwin M. Goldberg
By  Watson, Cole, Grindle & Watson
Attorneys

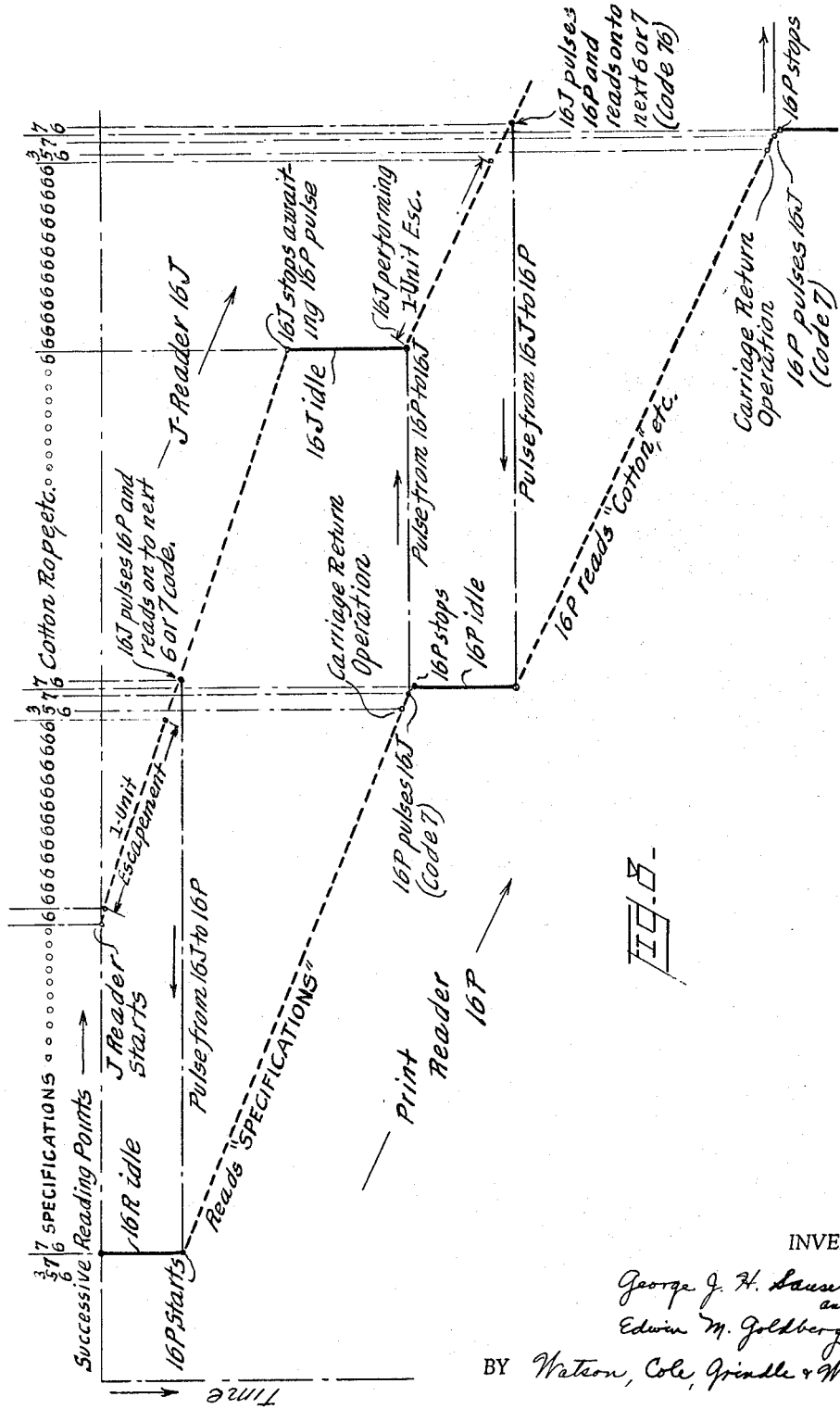

Aug. 23, 1966 G. J. H. SAUSELE ET AL 3,268,161
AUTOMATIC TYPOGRAPHIC COMPOSING
Filed July 31, 1963 16 Sheets-Sheet 5
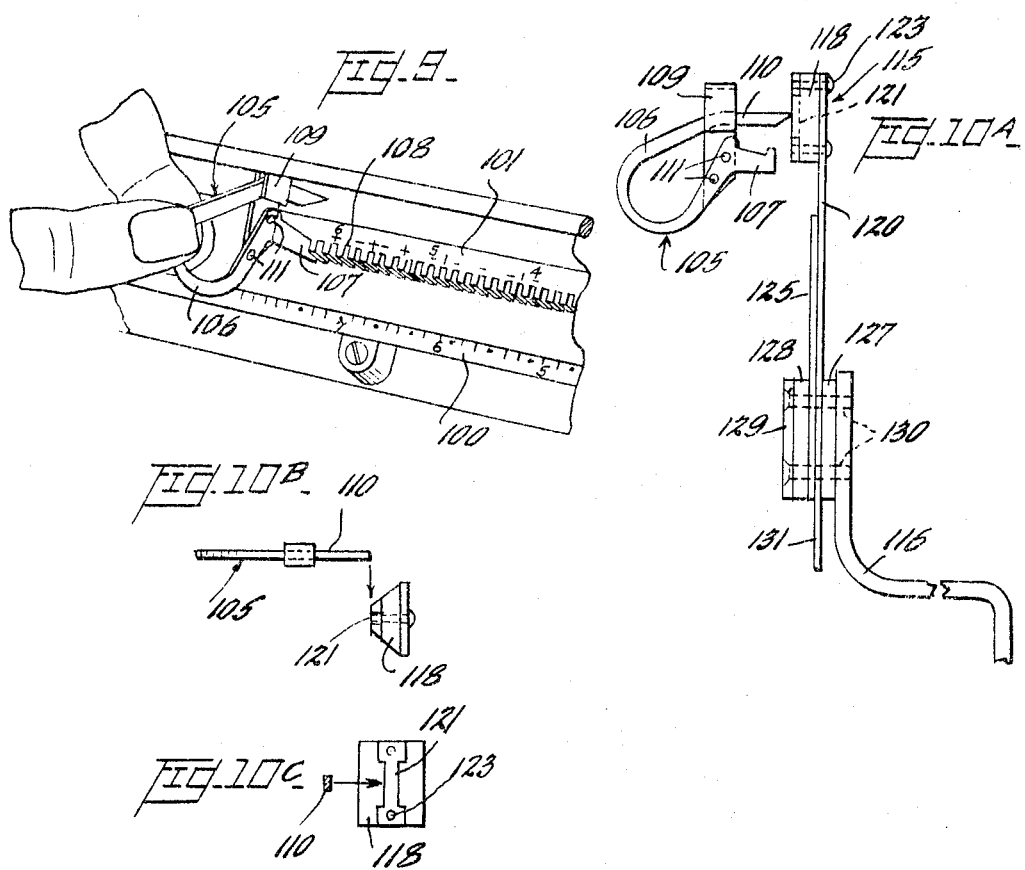
INVENTORS
George J. H. Sausele
Edwin M. Goldberg
BY Watson, Cole, Grindle & Watson
ATTORNEYS

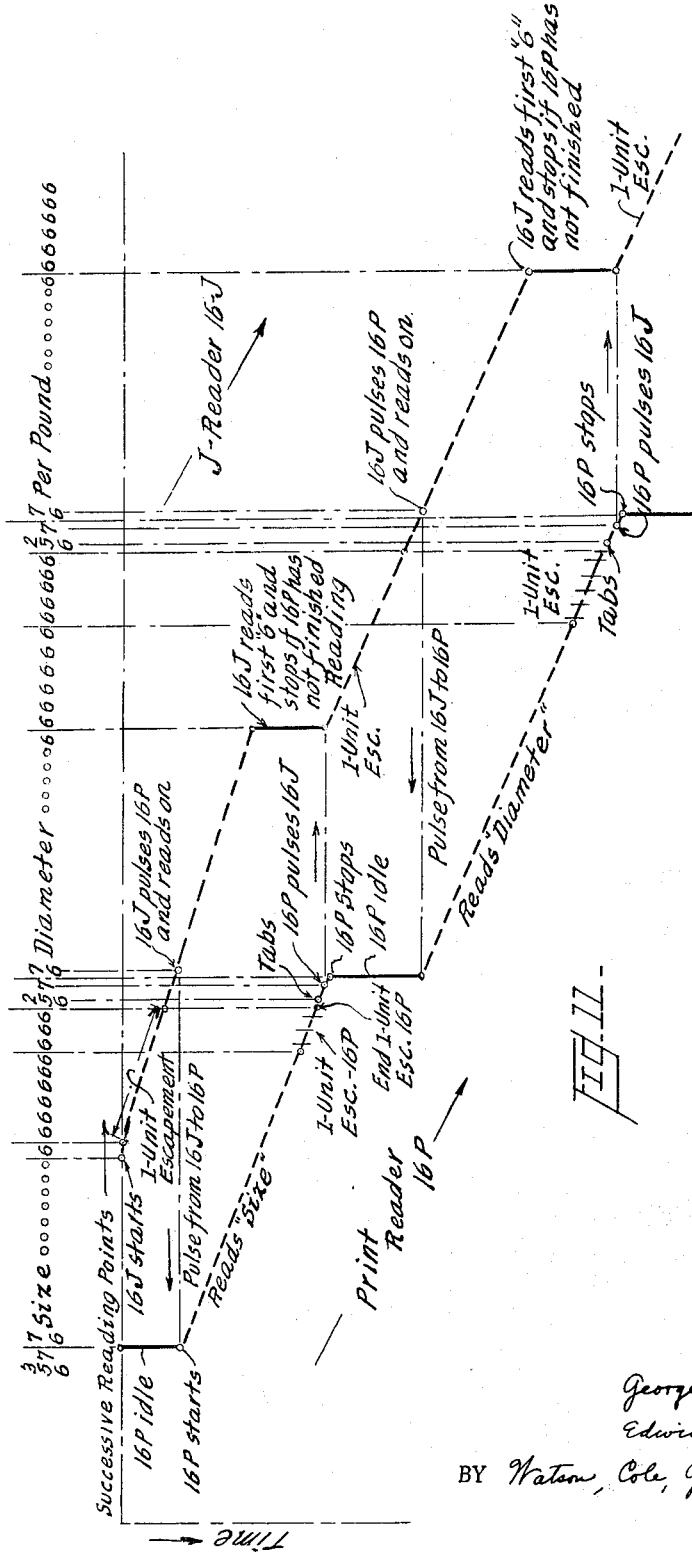

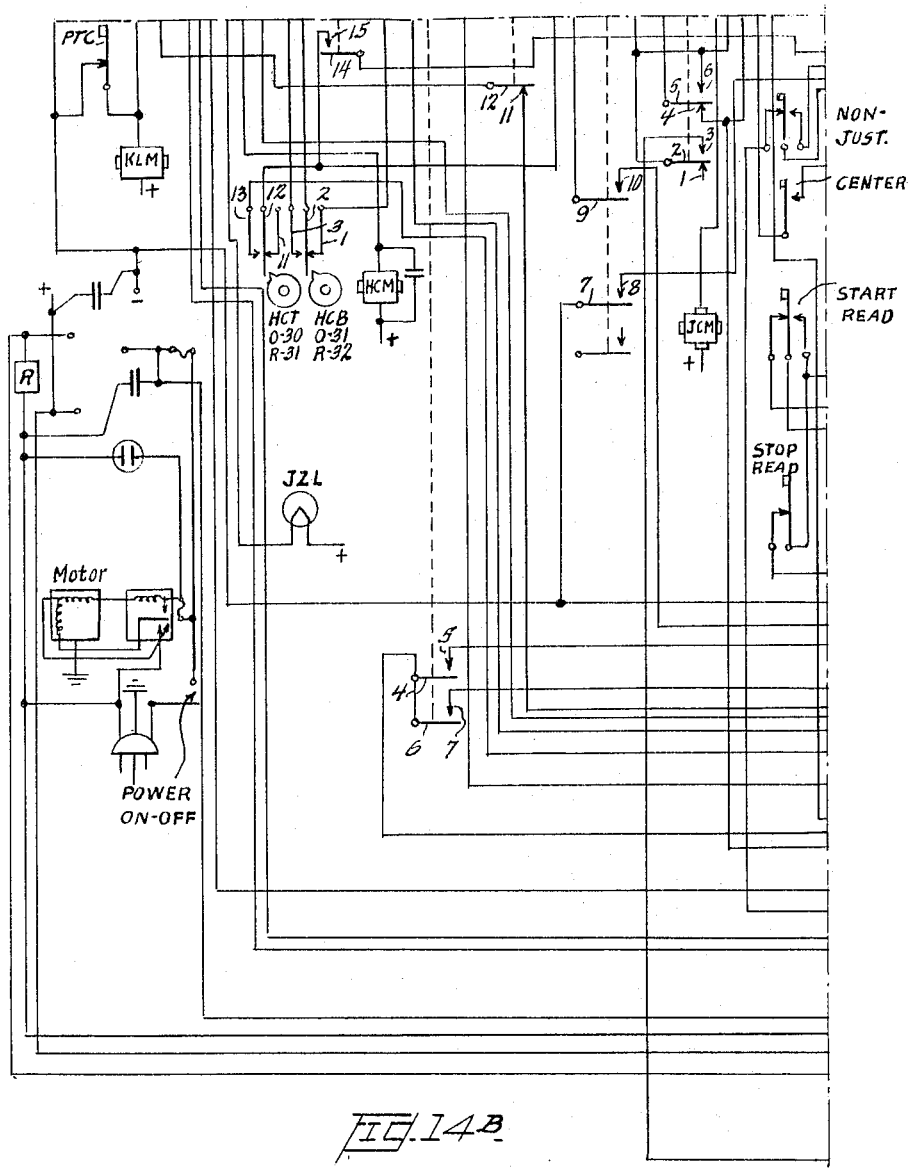

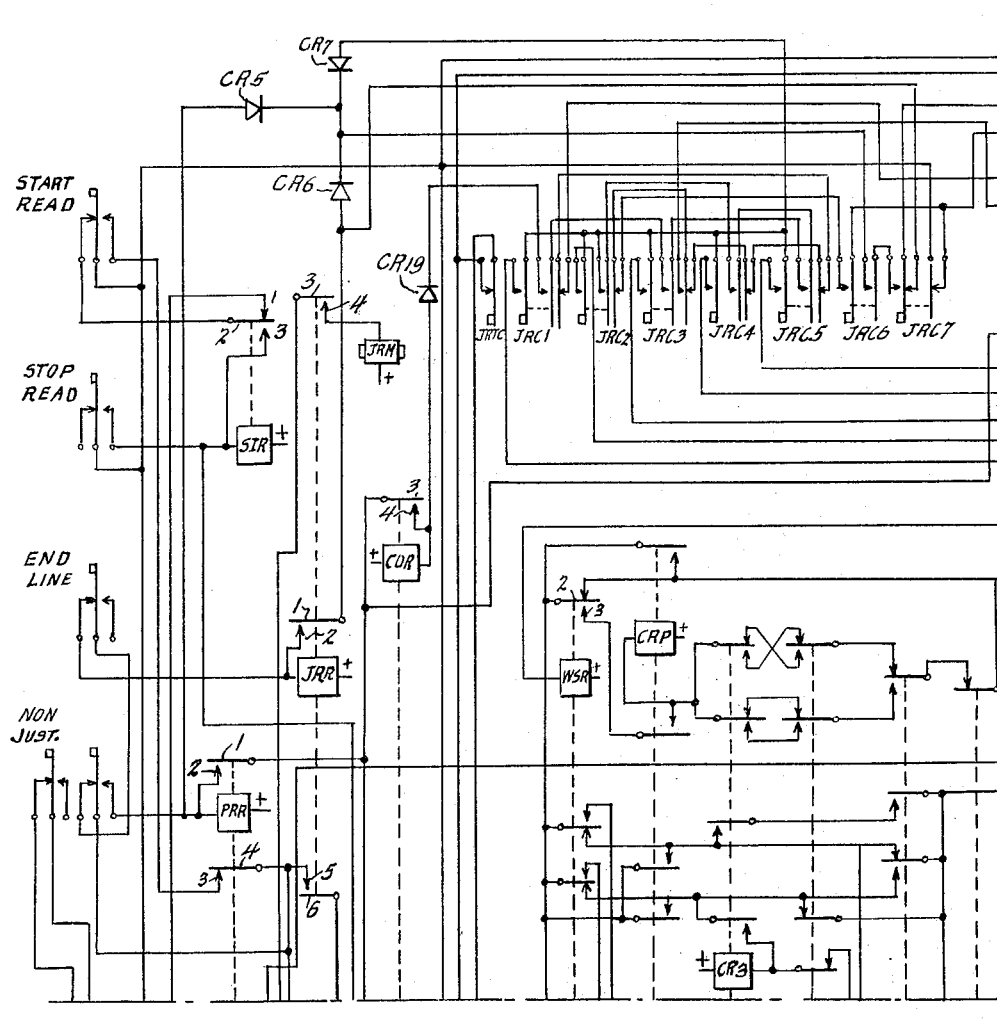

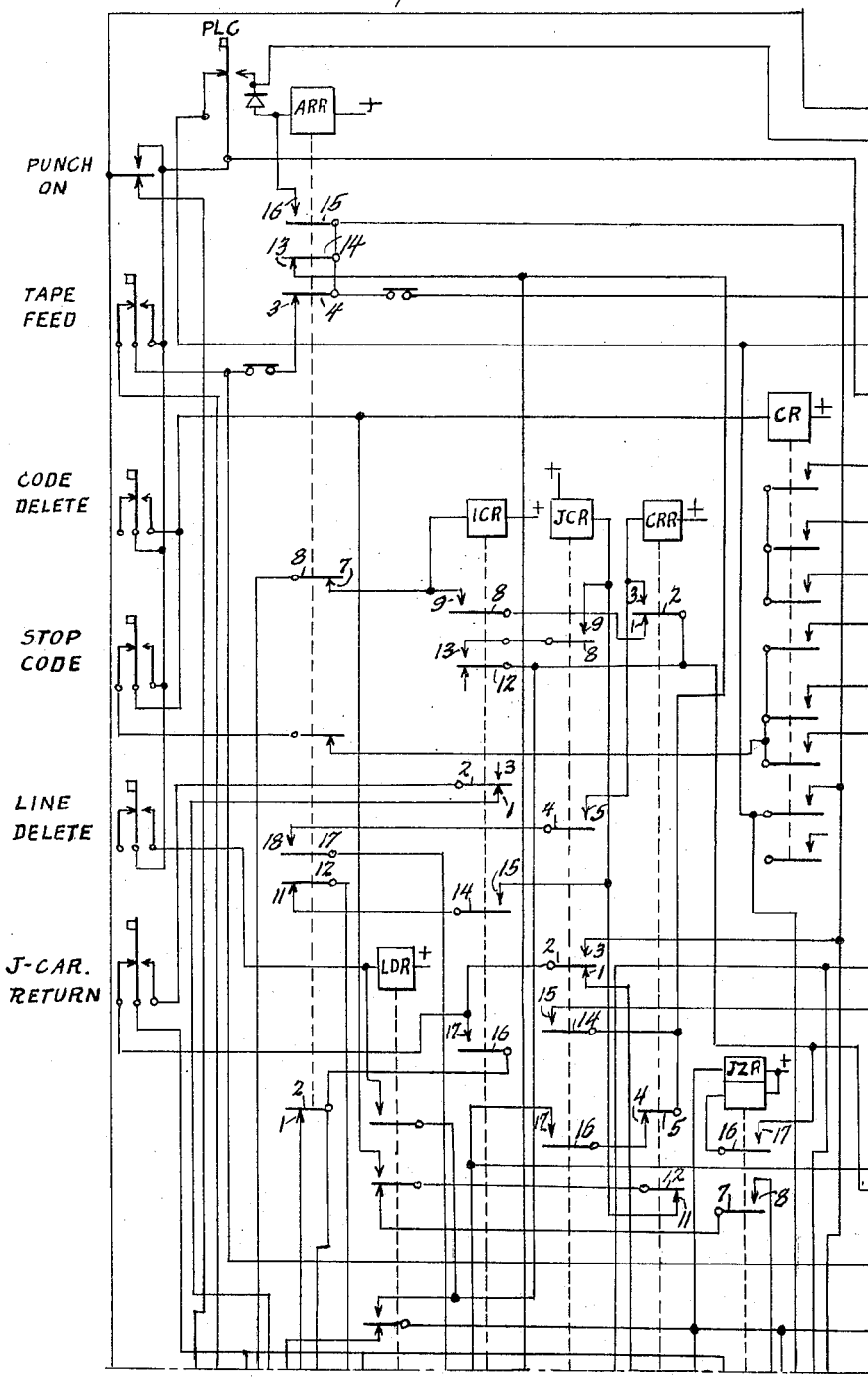

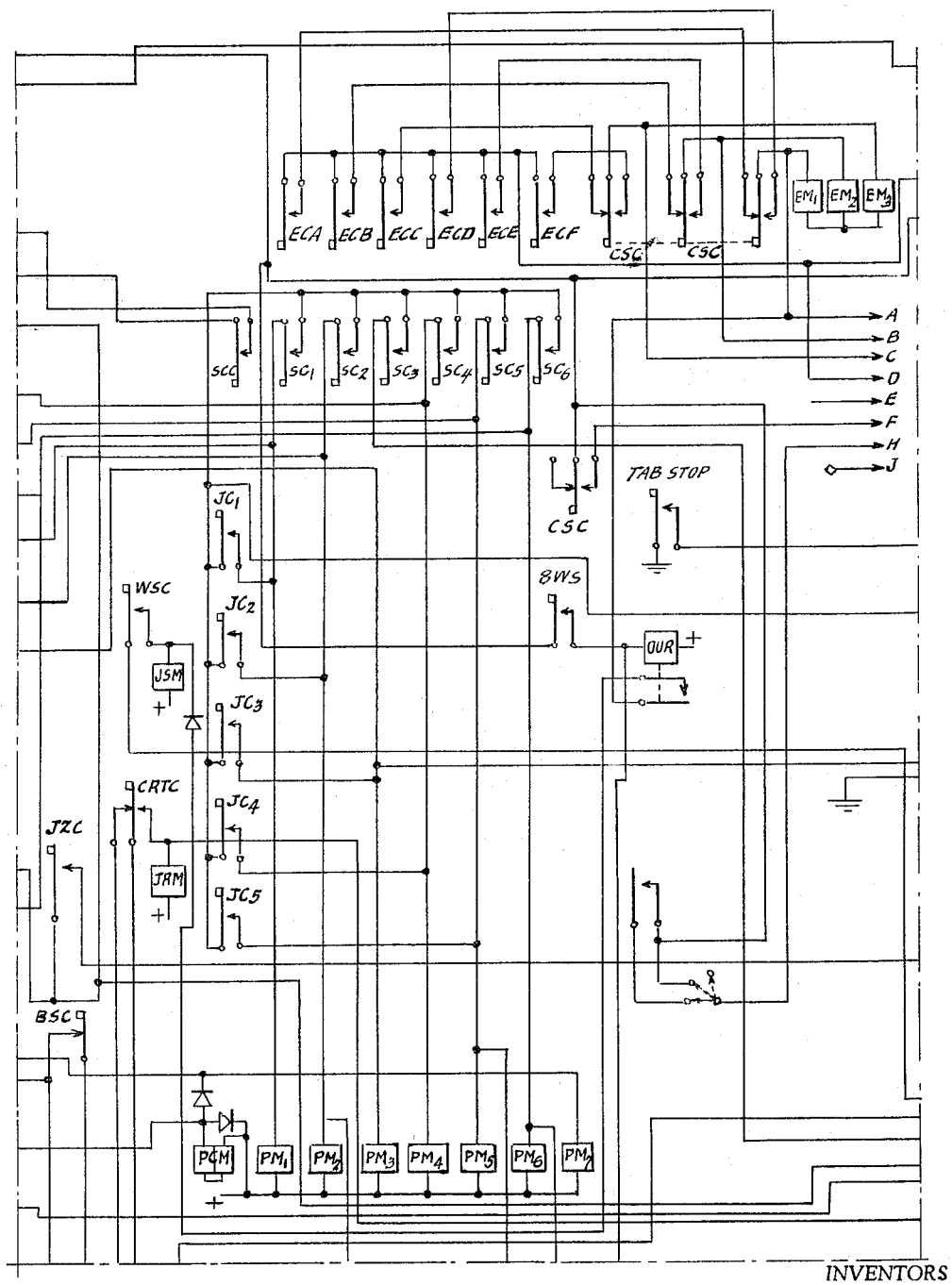

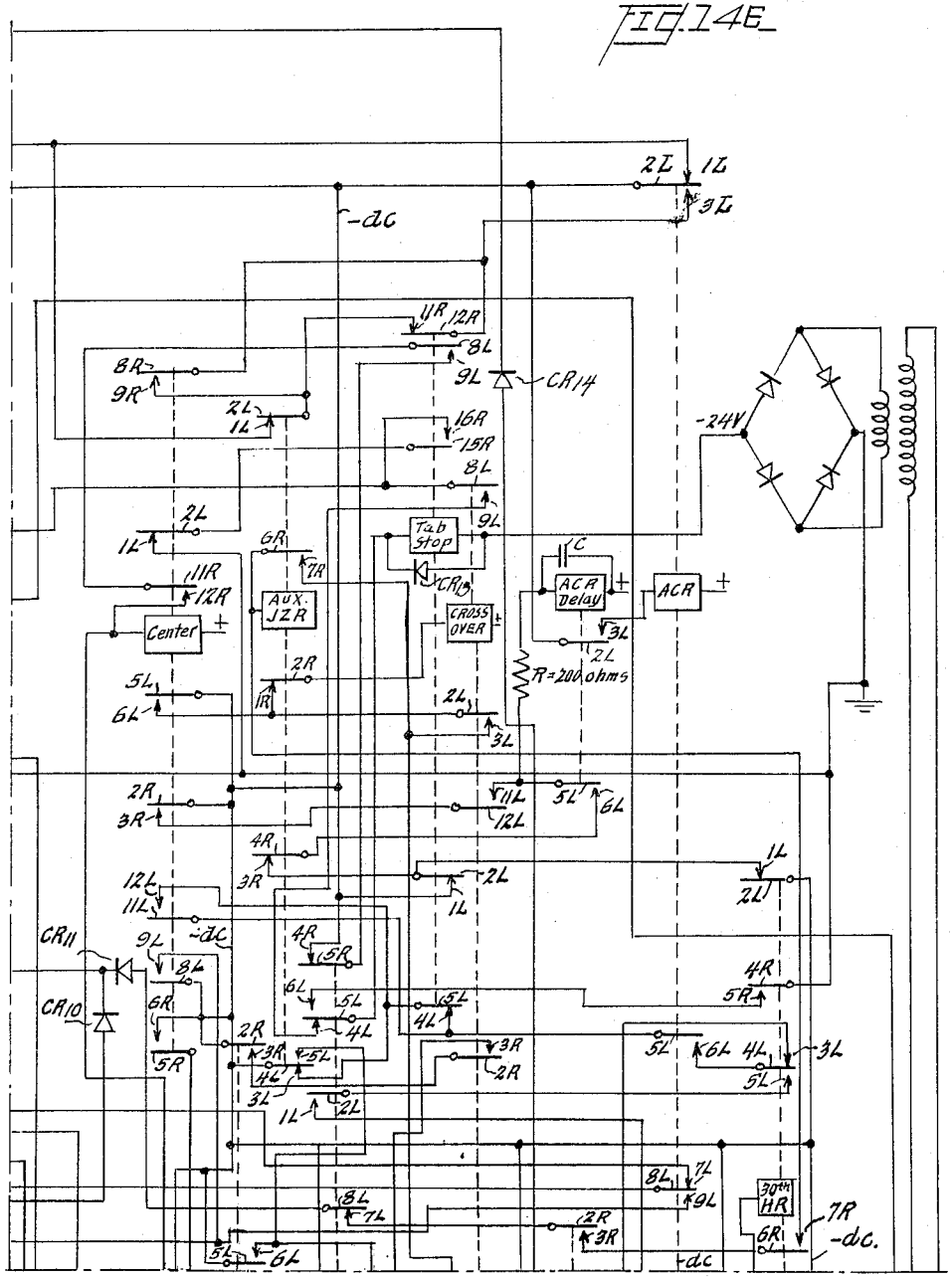

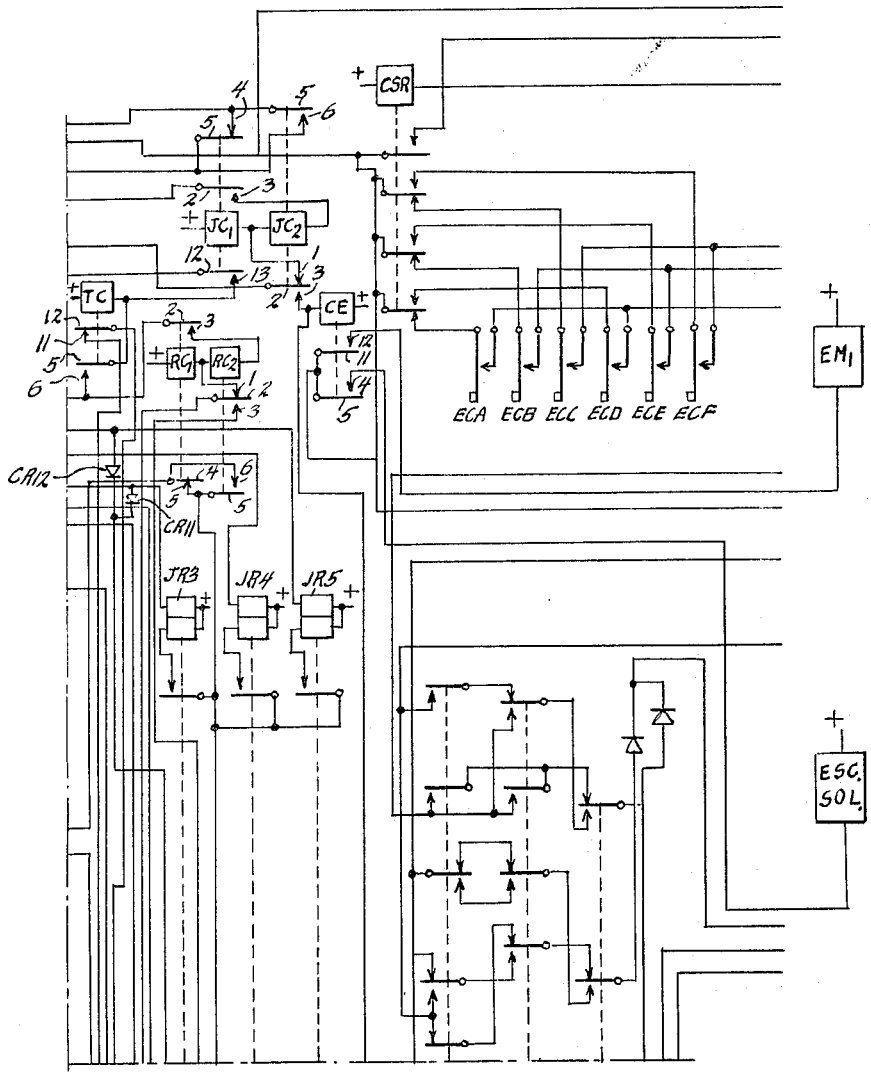

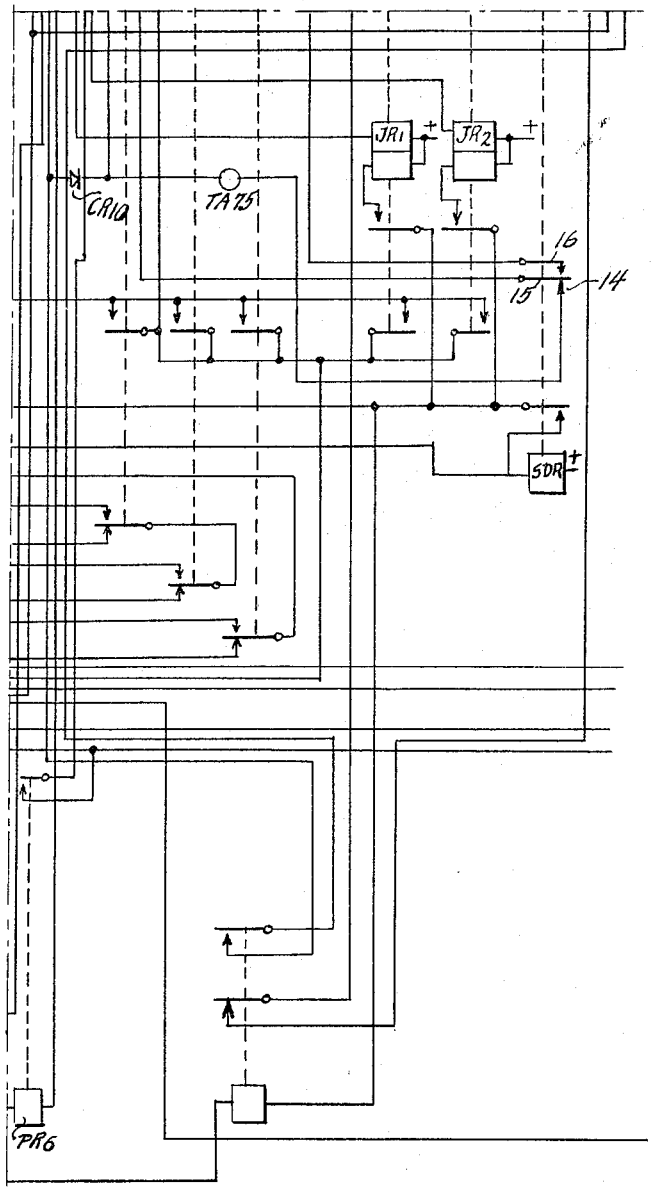

United States Patent Office 3,268,161
Patented August 23, 1966

3,268,161
AUTOMATIC TYPOGRAPHIC COMPOSING
George J. H. Sausele, New Providence, and Edwin M. Goldberg, Hazlet, N.J., assignors to American Type Founders Co., Inc., Elizabeth, N.J., a corporation of New Jersey
Filed July 31, 1963, Ser. No. 298,905
41 Claims. (Cl. 234—7)

This invention relates to text composing systems and components thereof, whether intended for the production of typewritten copy as in the case of the inventions disclosed in the United States patents to Edwin O. Blodgett 2,700,421, 2,700,445, 2,700,446, 2,700,447 and 2,934,145; or for the production of photocopy for use in offset or other kinds of printing as exemplified by the invention disclosed in the United States Patent 3,082,670, granted to George J. H. Sausele.

As in the case of the Sausele patent, the present invention derives much of its basic structure and its underlying operational and control features from the Blodgett development in justifying typewriters, operable either by keyboard actuation or by means of coded tape.

Thus, for the basic exemplifications of fundamental elements, mechanisms, and circuitry, much of the disclosures in these Blodgett patents and in the Sausele patent to which reference has been made, are incorporated into this present application by general and specific reference herein; and so far as practicable with the use of identical reference characters. The various departures in any mechaism or elements, modifications of structure, circuitry and operation, and other additions and alterations, will be disclosed and explained fully herein as the specification proceeds.

With this basic context in mind, the objects and features of novelty peculiar to the present invention may be set forth as follows.

The general object of the invention is the provision of novel and improved mechanism, circuitry, and procedures for the accomplishment of automatic centering of text, such as headings, in a line of type, such provisions operating with great speed and accuracy, in single or multiple centering, or in tabular form or mixed with justified textual matter.

The unique versatility of the device makes it available for centering between margins (full measure), centering in columns, centering over a plurality of columns, centering in some columns and bypassing other columns, or any combinations of the above columnar centerings—all automatically.

Within the purview of the present invention are the novel modifications of both the keyboard unit, or "recorder" as it is termed in the Blodgett patents, and the reproducer unit, which in the case of the Sausele development comprises the photo-typesetter machine.

In the former unit the text is keyboarded by the operator and the result is a typewritten proof and a tape punched with codes operative to not only transcribe the text characters and punctuation, but also to allocate the appropriate character widths, insert word spaces, justify the lines, and effect carriage return and line spacing. The typewritten proof and the associated carriage scale also serve to count increments of space across the measure, and this feature is taken advantage of in the development of the present novel centering procedures. Mechanism is provided in this unit by the present invention to automatically effect modifications in the space coding applied to the tape, to allocate equal white space areas in front of and beyond the text to be centered, and this by the depression of a single "CENTER" button or switch on the machine.

In the reproducer unit, means are provided for reading the tape codes for both printing and justification, the latter reading being effected by ingenious circuitry modifications and instrumentalities to cause the proper centering provisions to be set up first before the print of the text to be centered is read.

Other objects and features of novelty will be apparent from the following specification when read in connection with the accompanying drawings in which certain embodiments of the invention are set forth by way of example.

In the drawings:

FIGURE 1 is a view in perspective of a recorder or keyboard unit which is operated to produce a coded tape for actuation of the novel reproducer unit for a photo-typesetter machine and also to make the typewritten trial copy of the text.

FIGURE 2 is a similar view of the reproducer, in this example a typesetter, adapted to be actuated by the tape produced in the recorder machine;

FIGURE 3 is a fragmentary view in perspective showing a typical control tape as produced in the recorder and as it is ultimately fed through the reader devices of the reproducer;

FIGURE 4 is a schematic view diagramming the principal functional members of the two machines and showing their correlation;

FIGURE 5 is a fragmentary view of a specimen of printed columnar or tabular matter capable of being produced by the present novel system;

FIGURE 6 is a view of the typewritten proof obtained from the recorder during the process of setting up the composition for the printed matter shown in FIGURE 5;

Figure 14D:
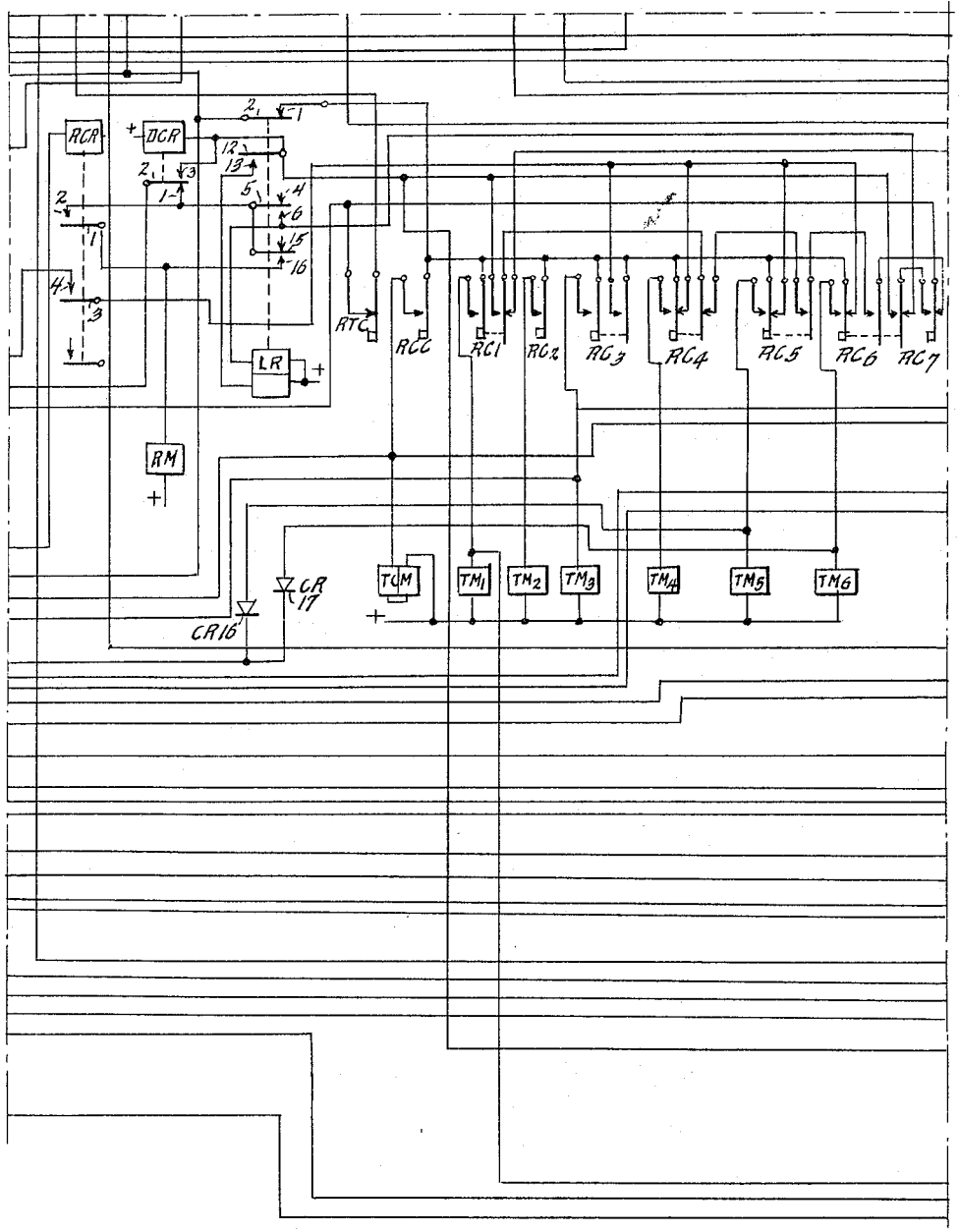
Figure 14F:
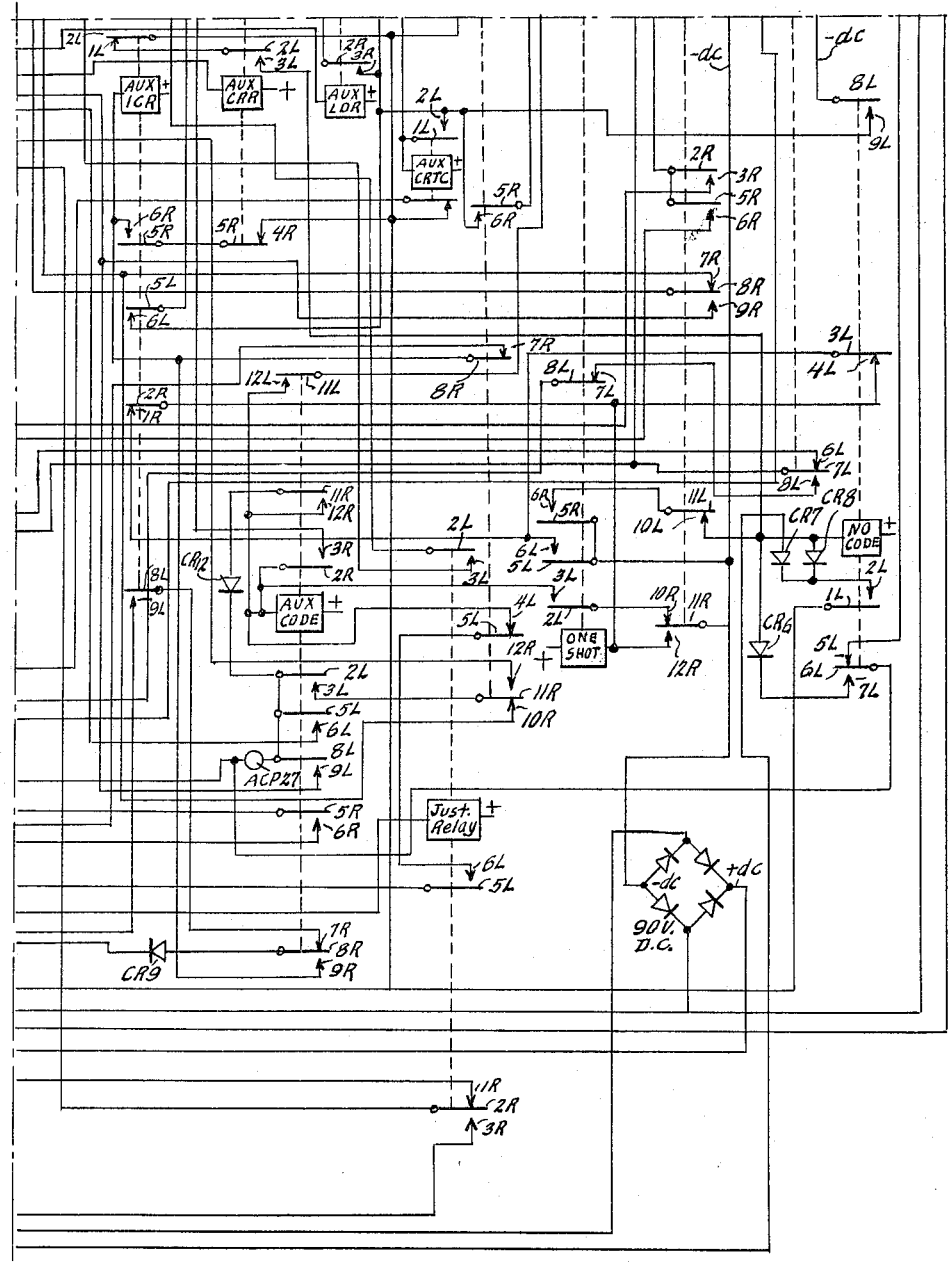
Figure 15B:
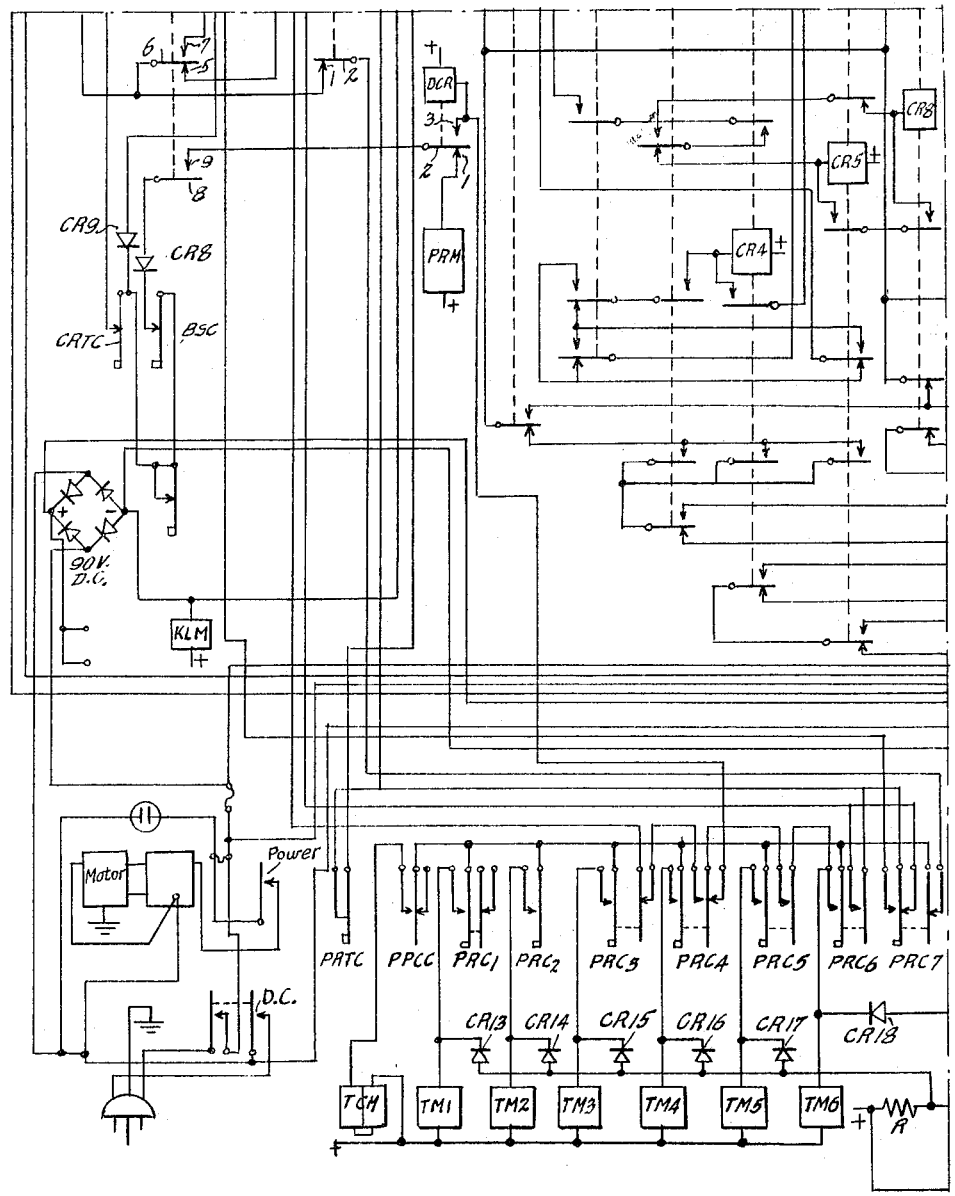

FIGURE 7 is a fragmentary view of the coded tape 11 as punched for the reproduction of at least lines 1 and 5 of the example set forth above;

FIGURE 8 is a diagram or chart interpretive of FIGURE 6 and indicating the alternate actuation and functioning of the print reader and the justification reader of the reproducer unit;

FIGURE 9 is a fragmentary view in perspective of a portion of the tabular rack on the carriage of the recorder machine showing the application of a tab stop thereto;

FIGURE 10A is a fragmentary view in elevation showing the fixed contact and the shiftable tab stop contact employed;

FIGURE 10B is a fragmentary view taken substantially at right angles to the upper portion of FIGURE 10A and showing the approach of the tab stop to the fixed contact;

FIGURE 10C is a face view of the fixed contact and its supporting structure;

FIGURE 11 is a diagram or chart similar to FIGURE 8 but introducing the tab features;

FIGURE 12 is a diagram showing the inter-relation of the partial circuitry FIGURES 14A–14F inclusive;

FIGURE 13 is a diagram showing the proper arrangement of the partial circuitry FIGURES 15A–15D inclusive embodied in the reproducer unit forming a part of the present invention;

FIGURES 14A–14F inclusive are components of the circuitry embodied in the recorder unit in accordance with the present invention, these partial figures to be joined in the manner shown in FIGURE 12; and FIGURES 15A–15D are partial components of the circuitry embodied in the reproducer unit to be joined in the manner indicated in FIGURE 13.

It will be recognized that the recorder or keyboard machine illustrated in FIGURE 1 and the reproducer exemplified in FIGURE 2 are substantially the same as the corresponding units of the typesetter system of the Sausele patent, and similarly the tape handling devices, including the tape punch 15 and the tape code reader 16, of FIGURE 3, are of the same nature.

In these figures, the trial copy recorder or keyboard machine is given the general designation A and the reproducer unit is denoted by B. The unit A is operated manually by means of the keyboard to make a typewritten copy of the text material, which will of course give an indication of the normal length of the lines. The keyboard mechanism, including the power cylinder and the linkages to the type bars, is shown in FIGURE 3 of Blodgett Patent 2,700,447 in the case of the recorder unit, and as adapted for the reproducer these parts are shown schematically in FIGURE 4 of the Sausele Patent 3,082,670 which is repeated as FIGURE 4 of the present application.

During this typing, a tape, designated 11 in FIGURE 3 of the present drawings, is punched with successive series of perforations, the number and position of the perforations at each point comprising a coded representation of a character, a space, or one of several other functional machine operations pertinent to the making of the desired type composition. At the trailing end of each line in regular text composition, a justifying code is also punched into the tape which directs that that line be expanded or contracted to the desired length upon reproduction on the typesetter or B unit, and also provides for return of the carriage.

The basic tape punching mechanism is indicated at 15 in FIGURES 1, 3 and 4 of the present application and the above mentioned Sausele patent; and the general nature, construction and function of the punch is fully described in Blodgett Patents 2,700,421 and 2,700,447, particularly in FIGURES 35 et seq. of the latter patent and portions of its specification especially from column 24 to column 35 therein.

The tape punch 15 is actuated electrically from contacts operated by a code selector device in the recorder unit, this code selector having its counterpart also in the reproducer unit. In the schematic view comprising FIGURE 4 of the drawings, the code selector (which may exemplify these devices for either the recorder or the reproducer or typesetter unit) is designated generally by the reference character 13. The construction and operation of the code selector in the recorder is fully set forth in Patent 2,700,447 in FIGURES 63–66. The most appropriate portions of the specification of the Patent 2,700,447 are the columns 22–24.

For operating the typesetter or reproducer unit B, the punched tape 11, edited and corrected if necessary, is fed into the combined tape reader 16 of the unit B (see FIGURES 2 and 3) which tape reader includes a print reader portion and a justification reader portion indicated respectively in the Sausele patent as 16P and 16R, and they will be so referred to herein. The basic details of these readers are clearly disclosed in the Blodgett patents, most particularly in Patent 2,700,447, FIGURES 51–56 of the drawings, and columns 38–43 of the specification.

As clearly explained in Blodgett Patent 2,700,447, and as practiced in the patented Sausele arrangement, the justification code is read by the justification reader first, even through it occurs at the trailing end of the line on the tape, and the mechanism and circuits are so interlocked as to perform their functions in the proper coordinated sequences, the justification reader section always finding the justification controls for each line before the printing reader starts reading that line. With this arrangement, there will always be a loop in the tape 11 between the justification reader or back reader and the forwardly located print reader as shown in FIGURE 3 of the present drawings.

The information gleaned from the tape by the print reader is transmitted electrically by the selective actuation of switch contacts (FIGURES 52–55 of Patent 2,700,447) to the code translator, designated 14 in FIGURE 4 of the present drawings and those of the patents mentioned. This arrangement is disclosed in detail in Blodgett Patent 2,700,447 in FIGURES 57–62 and in columns 43–47 of the specification. The various combinations of magnet actuation in the selective shifting of the permutation bars PB1–6 ensure that one and only one of the seekers 489 move into position to be operated by the seeker operating bails 530 and the positioning bail 523. The seekers are each associated with a character key or other functional key of the keyboard 10, and are adapted to actuate that particular key by means of the hooked upper end 490 of each of the seeker bars.

Referring now to FIGURE 4 herein and to FIGURES 3A and 63–66 of Blodgett Patent 2,700,447, and more particularly to lines 7–42 of column 24 of that patent, it will be understood how the code selector 13 is actuated from the key operating cams to selectively energize the character space selecting escapement magnets designated EM1, EM2, and EM3 in that patent, and corresponding to those designated LE1, LE2, and LE3 in the Sausele patent. Six switches ECA, ECB, ECC (for lower case operation) and ECE, ECD, ECF (for upper case operation) serve to energize the escapement magnets in Patent 2,700,447, and these switches find their respective counterparts in switches SE7, SE8, SE9, SE10, SE11, SE12 in the circuitry diagrams of the Sausele patent. Thus through the code selector 13 the particular carriage escapement for each character is appropriately provided for.

The variable escapement mechanism of the basic machine shown in the Blodgett Patent 2,700,447 is best disclosed in FIGURES 14–18 and 69 and in columns 13–15 and 50 et seq. of this patent, and it will be readily understood how the three escapement magnets, energized singly or in various combinations, may be made to release the carriage for different selected distances of travel to accommodate character widths of at least six different sizes, and also to effect escapement for word spacing and any other requirement for forward carriage movement.

Further in regard to the justification feature, it will be recalled how the justification code reader 16J registers the variable spacing information for a given line of composition before that line is read by the print-reader 16P, and is therefore prepared to allocate word spaces at different points along the line of the necessary widths to attain justification. The mechanism and circuitry involved in computing these justification allocations in the recorder A are set forth in FIGURES 40–50 and columns 30–34 in Patent 2,700,447; and the interpretation and application of the justification data to the escapement of the reproducer B is explained in columns 43, 47–53, with reference to FIGURES 51–56 and to the diagrams of FIGURES 70–73 of that patent.

Among the remaining basic functions to be traced from the Blodgett and Sausele patents is the carriage return provisions, and the initiation and powering of this function as it applies to the parent Blodgett machines is set forth particularly in columns 15–22 of Patent 2,700,447, but will be adverted to from time to time in the present specification in describing the unique centering operations.

Now before getting too deeply involved in the circuitry and electrical and mechanical details with which the automatic centering is most intimately concerned, it may be well to illustrate more fully what the novel automatic centering features are intended to accomplish. One example of the finished product of the present system is illustrated in FIGURE 5 in the form of a catalog of sizes and properties of rope and sash cord and this example includes various performances of the centering feature including automatic centering between margins as shown in lines 1 and 2 of the specimen of FIGURE 5; automatic centering over multiple columns in line 3; automatic centering in some columns but bypassing other columns in line 4; and automatic centering in all columns as shown in line 5 of the specimen. The automatic centering features afforded by the present invention eliminate the counting, calculating, and remembering how an item was centered previously, and accomplishes the entire job faster and more accurately at the touch of a single control key.

Anticipating the detailed explanation of the operation of the system, it may be briefly stated that in effecting the programming of the typesetter for automatic centering, special tab stops (to be described presently) are inserted in the tab rack of the recorder or keyboard machine at points corresponding with the width of the individual columns. Measure is set in the usual manner and the unit scale on the A machine may be marked with a grease pencil to keep in view the location of the tab stops. The operator then types the copy flush left to the margin, column, or columns to be centered over. The CENTER key is then depressed and automatically inserts a spacing code in the punched tape. When this tape is placed in the reproducer or photo-typesetter unit, the spacing code is read first, then by novel and ingenious means it is divided by two automatically, and an equal amount of white space is inserted before and after the typography of the line or heading.

In FIGURE 6 is shown the typed proof copy from the A machine which resulted in the reproduction of the finished printed copy of FIGURE 5. The corresponding margins and tab positions are indicated by broken lines.

Again, anticipating the detailed mechanical operation and requirements, it may be stated that in typing lines 1 and 2 of the specimen, the words "SPECIFICATIONS" and "Cotton Rope And Braided Sash Cord" are typed so that they appear at flush left on the typewritten proof and the CENTER key is depressed and held until the carriage of the keyboard unit has passed into the final column 7. Automatic spacing codes are thereby inserted in the tape which, when inserted in the reproducer or photo-unit, are divided by two, thereby moving the copy to its center position. Similarly, in the case of line 3, the heading "Braided Sash Cord" is typed so that it appears flush left on the typewritten proof, but the CENTER key is depressed and held until the carriage passes into column 4. Next the operator types "Rope" flush left on column 5 and the CENTER key is depressed and held until the carriage moves into column 7 and then released.

In line 4 where headings or parts of headings are typed in only four of the seven columns, columns 1 and 2 must be bypassed. Thus, the operator depresses the CENTER key until the carriage passes into column 2, then he types "Length" flush left in column 3 and depresses the CENTER key only momentarily. Then the word "Breaking" is typed flush left in column 4 and the CENTER key is depressed and held until the carriage moves into column 5 thus bypassing column 5. Columns 6 and 7 are then centered in the same manner as columns 3 and 4. Finally, in line 5 where automatic centering occurs in all seven columns, the word "Size" is typed flush left to the margin, the CENTER key is depressed momentarily, moving the carriage to column 2; the word "Diameter" is typed flush left to column 2 and the CENTER key is again depressed momentarily, moving the carriage to column 3. The other columns in this example are handled in exactly the same manner.

Now again, before going into the novel circuitry, it might be well to disclose the installation of the tab stop contacts which are required in centering tabular work. The "tab stop" provided here may be in addition to the mechanical tab stops of conventional keyboard machines and both may be employed in the present novel apparatus to perform their individual functions in setting up various kinds of centered and tabular composition. It is understood that the element designated as a "tab stop" herein is to be understood as a tabular control means which is preferably an electrical contact, and which may or may not perform the conventional tab stop function.

In FIGURES 9 and 10A to 10C of the drawings there are disclosed certain details of the tab stop contact feature. In FIGURE 9, which is a quite fragmentary view of a portion of the carriage of the recorder unit A, there is shown a scale 100 fixed to the carriage and in association with a tab rack 101 which is also marked with a scale indicative of selected positions of the tab stop. The tab stop is given the general designation 105 and comprises a flat planar looped metal element 106 with a notched arm 107 adapted to fit in selected ones of the notches 108 on the rack 101. A flat looped guide strap 109 has its arms secured as by means of the rivets 111 to a portion of the arm 107 and guided between the arms of the strap 109 is the pointed contact arm 110, the tip of which is adapted to make electrical contact with a fixed cooperating contact carried by the base frame of the machine.

The opposite contact device designated 115 is carried by a bracket 116 which is fixed to the base of the recorder so that the contact is placed in the path of the several tab stops 105 set up along the rack bar 101. A bevelled contact supporting head 118 is carried by the end of the contact leaf 120. The actual contact element itself is in the form of a flat narrow strip 121 having enlarged ends through which holes are formed to receive fastening elements. The upper face of the contact head or support 118 is cut out to receive the element 121 and both the parts 118 and 121 are secured to the end of the leaf 120 by means of the screws, rivets, or other fastening elements 123. Along with the adjusting leaf element 125 the contact supporting leaf 120 is received between the insulator blocks 127 and 128. Surmounting the insulator block 128 is the rectangular clamp washer 129 and the opposite insulator block 127 is applied to one arm of the supporting bracket 116, and the entire shank assembly of the contact member is secured to the bracket by means of the fastening elements indicated at 130. The extreme rear end 131 of the contact leaf element 120 is provided with means for the attachment of a conductor wire joining the relevant circuitry to be described.

At this point, it will be well to list the important mechanical and electrical elements involved in the operations described herein, both those which are common to the Blodgett system and certain newly added elements used in making the automatic centering and automatic leadering possible. In this tabulation, the reference characters designating the features are given first, then a designation of the element, and then figures of drawing and columns in the Blodgett Patent 2,700,447 in which the operation and association of the element is described, if that element is common to the present invention and the Blodgett installation. In this way, the following narrative description of the various operations and tracing the circuitry will become clear. It should also be pointed out at this juncture that FIGURES 14A, 14B, 14C and 14D herein comprising the left-hand portions of the recorder or keyboard circuitry corresponding generally to the Blodgett circuitry set forth in FIGURES 70 and 70A of Patent 2,700,447 but include other circuitry some of which occurs in Blodgett's FIGURES 71, 71a, 71b, and others of which is employed in the present automatic centering feature, and still other of which does not enter into the specific aspects of the present invention but is included to provide a complete picture of the circuitry as installed.

ITEMS OF CIRCUITRY COMMON TO THE PRESENT ARRANGEMENT AND THE BLODGETT PATENT 2,700,447

| Designation | Title | Blodgett: Figures of Drawing | Blodgett: Columns of Specification |
|---|---|---|---|
| EM1-3 | Escapement Magnets | 16, 67, 69, 70, 71 | 5, 8, 13, 14, 22, 24, 50, 51. |
| ECA-ECF | Escapement Contacts | 29, 63, 70, 71 | 5, 6, 24. |
| TM1-6 | Translator Magnets | 58, 71 | 43-45. |
| WSC | Word Space Contacts | 70, 71 | 8, 35, 36, 50-52. |
| CRTC (CRC) | Carriage Return Contacts | 9, 10, 19, 70 | 21, 22, 38, 48, 49. |
| BSC | Back Space Contacts | 71 | 21, 48, 49. |
| TCM | Translator Clutch Magnet | 71 | 25. |
| KLM | Key Lever Lock Magnet | 2, 70, 71 | 9, 34. |
| SCC | Selector Common Contact | 29, 70 | 6, 23, 25, 34-36. |
| SC1-6 | Selector Code Contacts | 29, 70 | 6, 23, 25, 34, 35. |
| PCM | Punch Clutch Magnet | 36, 45, 70 | 23-26, 34-37. |
| PM1-7 | Punch Magnets | 35-37, 70 | 6, 22-25, 27, 28, 34-38. |
| JCR | Justification Control Relay | 70 | 36-38, 43. |
| PTC | Punch Tape Contacts | 35, 70 | 29, 34. |
| HCM | Hole Count Magnet | | |
| HCB | Hole Count Contacts | 40-41, 70 | 30, 31, 36-38. |
| HCT | Hole Count Contacts | | |
| JC1-5 | Justify Code Contacts | 41, 43, 45, 46, 48, 70. | 31, 34, 37. |
| JSM | Justify Space Magnet | 43, 70 | 31, 32, 35, 36. |
| JZC | Justifying Zone Contacts | 41, 70 | 32, 33, 36, 37. |
| JZL | Justifying Zone Lamp | 70 | 33, 36, 37. |
| JCM | Justify Code Magnet | 45, 48, 70 | 33, 34, 37. |
| JRM (FIGS. 70+) | Justify Restore Magnet | 46, 47, 70 | 7, 32, 38. |
| PLC | Punch Latch Contact | 35, 70 | 34, 35, 37, 38. |
| ARR | Anti-Repeat Relay | 70 | 34-38. |
| CR | Code Relay | 70 | 35, 37. |
| ICR | Interlock Control Relay | 70 | 36-38. |
| LDR | Line Delete Relay | 70 | 37, 38. |
| CRR | Carriage Return Relay | 70 | 37, 38. |
| RTC | Reader Tape Contact | 51a (2,700,446) | 33, 39. |
| RCC | Reader Common Contact | 54 | 38, 41. |
| RC1-7 | Reader Code Contacts | 51a (2,700,446) | 39, 40. |
| PRCC | Print Reader Common Contact | 71 | 8. |
| JR1-6 | Justification Storage Relays | 71 | 8, 48, 51. |
| WSR | Word Space Relay | 71 | 51, 52. |
| SDR | Step Down Relay | 71 | 8, 51. |
| JRM (FIGS. 71+) | Justify Reader Magnet | 51, 52, 56, 71 | 7, 43, 48, 49. |
| CR3, 5, 4, 8 | Counting Relays | 71 | 48, 51. |
| JRTC | Justify Reader Tape Contact | 71 | 47. |
| PRTC | Print Reader Tape Contact | 71 | 47. |
| PRR | Print Reader Control Relay | 71 | 48-50. |
| JRR | Justify Reader Control Relay | 71 | 48-50. |
| JRC1-7 | Justify Reader Contacts | 71 | 48, 49. |
| SIR | Stop for Insert Relay | 71 | 49, 50. |
| RCR | Reader Control Relay | 51 (2,700,446) | 39. |
| DCR | Delay Control Relay | 71 | 48, 49. |
| RM | Reader Magnet | 51 (2,700,446) | 39, 40. |
| COR | Cut-Out Relay | 71 | 50. |
| PRM | Print Reader Magnet | 56, 71 | 7, 48, 50. |
| CRP | Counting Relay Prime / Half Step Relay | 71 | 51, 52. |
| PRC1-7 | Print Reader Contacts | 71 | 48, 49. |

PRINCIPAL ITEMS OF CIRCUITRY INTRODUCED BY THE AUTOMATIC CENTERING PROVISIONS

Center Relay _____ Auxiliary CRR.
Tab Stop Relay _____ Auxiliary LDR.
Crossover Relay _____ Auxiliary CRTC.
ACR—(Auto Centering Relay) _____ Auxiliary Code Relay.
ACR Delay Relay _____ One Shot Relay.
30th Hole Relay _____ No Code Relay.
Auxiliary ICR _____ Justify Relay.
TC—Tab Centering Relay _____ J-Tab Relay.
RC1—Print Reader Centering Relay (1) ____ CE—Centering Escapement Relay.
RC2—Print Reader Centering Relay (2) ____ PR6—Print Reader Relay (6).
JC1—J-Reader Centering Relay (1).
JC2—J-reader Centering Relay (2)

KEYBOARD SWITCHES ON PRESENT MACHINES
[See FIGURES 1 and 2 and circuitry]

A-Machine:
  a—Center
  b—Tape Feed
  c—Code Delete
  d—Start Read
  e—Non-Justify
  g—Stop Read
  h—Stop Code
  i—Line Delete
  j—J-Car. Return
  k—Punch On
  l—On-And-Off B-Machine:
  m—Start Read
  n—Stop Read
  o—End Line
  p—Non-Justify
  q—Motor On-And-Off
  r—Current On-And-Off In order to fully understand the present centering feature and its operation, a familiarity with the line ending coding and resulting operation of the Blodgett system is desirable. For this purpose, reference is made to FIGURE 73 of Patent 2,700,447 and columns 36, 37, 38, 47, 48, 49 and 50 of the specification of that patent, where the significance of the interlock code "7," and the "76" code which accompanies the usual justification code, and the carriage return code "356," are described. Similar accounts are to be found in Patents 2,700,421, 2,700,445 and 2,700,446.

Before tracing a specific example of automatic centering through the circuitry of the recorder unit A (FIGURES 14A–14F inclusive) it should be recalled that in the tape code system employed in the Blodgett disclosures and normally used in the present case for "word spacing" is number "3" (see FIGURE 73 of Blodgett 2,700,447) and this is set in these machines as a two-unit escapement. But in order to obtain the novel result of automatic centering, the punch code number "6" is employed as the "Centering Code" in this present development. This "6" code alone has never been assigned a function in normal practice in these systems, and is useful in the present novel process of escaping in the recorder or keyboard machine at two-unit escapement, and reading in the reproducer unit at the rate of a one-unit escapement, thus halving the total white space in a line to be centered, and interposing this half measure in front of the text comprising the line.

Another point to be noted in following the example through the circuitry is that, for reasons which will appear presently, the carriage return codes "356" and tab codes "256" are punched ahead of the "7" and "76" codes, but actual carriage return occurs coincidentally with the occurrence of the first feed hole following the "76" code. It would be well to have FIGURES 7 and 8 at hand while tracing the circuitry.

Using the specimen of FIGURE 5 as an example of the work to be accomplished, and remembering that the trial typewritten copy obtained from the recorder A will appear as in FIGURE 6, we can now proceed to a consideration of the actual tape product of the recorder shown in FIGURE 7 and the explanatory diagram of FIGURE 8. It will be noted that in the interest of economy of space, only line 1 and portions of line 5 have been included in the tape.

With the recorder A properly powered by the manipulation of the appropriate switches, the text of the first line, which of course is the word "SPECIFICATIONS," in upper case characters, is keyboarded with the carriage in position to impress the word flush left of the full measure of width. Then after the text of the title is keyboarded the CENTER button is pressed which, as will be explained fully in the detailed description of the circuitry, starts a chain of events which results in the following perforation of the tape.

In FIGURE 7 it will be noted that the codes for the text of the title are indicated and then it will be noted that the tape is merely punched with feed holes up to the thirty code holes required as the normal spacing between the justify code reader and the print code reader of the reproducer machine. When the required number of tape feed holes has been punched the recorder begins to punch codes for the numeral "6" which in the recorder represents a series of two-unit escapements. This continues up to the end of the full measure across which the word "SPECIFICATIONS" is to be centered. For a purpose to be described later, there is one extra "6" code punched and then occurs the carriage return code "356," followed by the interlock code "7" which is in turn followed by the code "76" (but without any additional justification codes which ordinarily would be selected from the codes 1–2–3–4–5). Then automatically follows carriage return operation but with no carriage return code impressed at that point. Thus the line stands complete, containing the proper letter codes and interlock codes.

Now anticipating somewhat, the tape is fed into the reproducer or photo unit B with the justification reader 16J about to read at the first number 6 on the tape and the print reader 16P about to read at the justification code 76. When the START READ button is pushed and released the 16J reads all of the 6 codes but lets the carriage escape one unit only for each 6 after the first one, the first 6 serving as a signalling or interlocking code.

On completion of the justification reader escapement, this reader pays no attention to the next 356 code but reads the 7 and then reads the 76 code which denotes the end of the justification escapement, then pulses the Print Reader, and continues reading to the next 6 or 7 codes. The Print Reader then reads 76 and goes on to read the text which is now centered over the full measure of the sheet, paying no attention to the tape feed and number 6 codes. The next character the print reader obeys is the carriage return code 356. The carriage return operation is performed and the Print Reader is stopped after reading the following 7 code. Print Reader on reading the 7 code also pulses the J-Reader.

This full measure centering procedure is graphically illustrated in FIGURE 8 of the drawings wherein the horizontal coordinate represents successive reading locations or space, and the vertical coordinate represents the time sequence. The progressive actions of the Justification Reader 16J and the Print Reader 16P will then, of course, follow descending diagonal lines as represented in the FIGURE 8.

First the Justification Reader starts reading at the initial 6 code of the series following the first line text. The Print Reader of course does not start at this point but is idle until pulsed by the J Reader. The J Reader reads through the centering codes 6 giving one unit escapement for each code and then passes the carriage return code 356 and the interlock code 7. Upon arriving at the justification code 76 the J-Reader pulses the Print reader which then begins to read the text of the first line, namely, the word SPECIFICATIONS. Meanwhile, the Justification Reader after pulsing the Print Reader continues through the area of the text of the second line, and through the feed hole area up to the first centering code 6 beyond the text of the second line.

Meanwhile, after being pulsed at the point 76 by the Justification Reader, the Print Reader is in the process of completing the first line, namely, the word "SPECIFICATIONS," continues through the necessary completion of the 30 hole feed area, through the extent of the centering codes 6 and then obeys the 356 code with a Carriage Return operation. The very next code is the interlock code 7 and this causes the Print Reader to stop and pulse the J Reader which has, in the meantime, reached the first centering code 6 of the second line of text. If the J-Reader has not yet reached the first number 6 code, the interlock code 7, read by the Print Reader, stops the Print Reader. The J-Reader, later arriving at the first 6 code, senses that the Print Reader is stopped, and will continue reading. The J-Reader proceeds to read the 6 codes of the second line yielding one unit of escapement for each code. Meanwhile, the Print Reader has stopped and awaits the pulsing which it will be given upon the arrival of the Justification Reader at the next Justification code 76. At this point, as in the description of the reading of line 1, the Justification Reader continues while the Print Reader starts to read the text of the second line, namely, "Cotton, Rope, etc." and continues to carriage return and stops after reading the next 7 code. This procedure is repeated through all the lines requiring full measure centering.

Now back to the keyboarding of the Recorder unit A for centering: the tab stops are set on the tab rack, as previously described in connection with FIGURES 9 and 10A–10C of the drawings, where the stop 105 can make contact with the other switch point 121 for sensing the position of the predetermined tabular limit. In this operation, taking for example the line 5 of FIGURE 5, the text comprising the word "Size" is typed flush left, then the CENTER button is depressed, and the feed holes are punched up to the quota of thirty holes, then the two-unit codes comprising the series of 6's is punched. Then when the tab stop is sensed, the circuit is completed and the escapement stopped and similar automatic cycling takes place, that is, a code corresponding to the tab code 256 is punched, then the 7 code, then the 76 code, and then since the carriage is not to be returned at this point, no carriage return operation is called for.

Then following the specimen tape illustrated in FIGURE 7 of the drawings, the column heading "Size" with its tab code and the interlock codes will be completed, and the next heading "Diameter" is typed flush left to the tab mark. Then the thirty tape feed holes (mainly to take up the slack between the 16J and the 16P are punched, then the series of 6 codes denoting two-unit escapements, then the tab code 256, then the interlock code 7, then the 76 code and then a repetition of the next title or heading across the page until the end of the full measure is reached.

Now returning to the Reproducer or Photographic Unit B for the setting up of line 5 as indicated in the specimen of FIGURE 5, it will be convenient to follow the chart comprising FIGURE 11 of the drawings which is coordinated in the same way as FIGURE 8 which represents full measure centering, the horizontal coordinate representing successive reading location and the vertical coordinates time.

As in the former case, the Justification Reader starts to read upon encountering the first centering code 6. Meanwhile the Print Reader is idle or marks time, the tape having been started in this Reader when about to read the 76 code. The Justification Reader proceeds to read the centering codes 6, escaping the carriage one unit for each code, passes the tab code indication 256 and the interlock code 7. When it reaches the code 76, it pulses the Print Reader as indicated by the arrow and proceeds on through the area represented by the text of the second column of the tabular matter.

Upon being pulsed by the Justification Reader the Print Reader immediately begins to read the text of the first column, namely, the word "Size," continues on through the necessary feed hole area and passes through the first seven of the number 6 centering codes with no operation on the part of the Print Reader, however, the following 6's are given a one unit escapement by the Print Reader. The next code read by the Print Reader is a 256 and the carriage performs its function as a tab and the Print Reader reading the next code which is a 7 stops and pulses the J-Reader.

Meanwhile the J-Reader has passed the area of the text of the second column, has proceeded through the feed hole area and has read the first centering code 6 and is stopped at this point to await the next pulsing from the Print Reader. The Print Reader has, at that time, read the 7 code and pulses the J-Reader for further progress through the number 6 centering code escaping one unit for each code. Meanwhile, however, the Print Reader has stopped and awaits the next signal from the J-Reader.

After escaping the carriage for the second column through the full extent of the centering codes 6 and passing the next tab code and interlock codes the Justification Reader arrives at the next 76 code. It continues on, but upon reading the 76 code, pulses the Print Reader as indicated by the arrow, which then reads the text of the second column, namely the word "Diameter." The Print Reader then continues through the completion of the feed hole quota, through the first seven of the centering codes 6 and then escapes the carriage one unit at a time through the balance of the 6's and then receives the 256 tab signal. Upon reading of the very next code which is the interlock code 7 the Print Reader pulses the J-Reader and stops.

The J-Reader by this time has passed through the area of the text of the third column and its succeeding feed holes and arrives at the first centering code 6 whereupon it stops and pauses until it receives this latest pulse from the Print Reader. This procedure is continued throughout the remaining columns of the tabular composition.

It should be noted at this point that in centering over a plurality of tab stops, the carriage of the reproducer must escape at least beyond the next to the last tab stop before the carriage performs the tab operation. Otherwise the tab code 256 would jump the carriage only up to the next tab position. This precaution is observed only in tabular work; in full measure work carriage return operates right after the completion of the text.

Following is an outline of the simple procedure the operator is called upon to perform in operating both the recorder or keyboard unit A and the reproducer or photo-typesetter unit B.

KEYBOARD UNIT

I. *Full measure centering*

A. With Tab Stops removed:
(1) Set Margin Stop to proper measure.
(2) Type item to be centered.
(3) Depress CENTER Switch.
NOTE: Any line in J Zone may be justified if desired.
B. With Tab Stops in place:
(1) Set Margin Stop to proper measure.
(2) Depress CENTER switch, holding it down for the entire keyboard length, or until pointer passes the last Tap Stop. Releasing CENTER switch allows machine to automatically complete cycle and carriage return.

II. *Tabular Centering*

A. Within consecutive single columns:
(1) Set Tap Stops in proper positions to conform to desired column widths.
(2) Type item to be centered within Column 1.
(3) Depress CENTER switch, releasing it before pointer reaches the next Tab Stop. Machine will automatically space over and stop on the next Tab Stop.
(4) Type item to be centered within Column 2.
(5) Repeat step 3 and proceed through each consecutive column.
B. Within non-consecutive single columns:
(1) To skip over one or more columns in Automatic Centering, depress the CENTER switch, releasing it before pointer reaches the desired Tab Stop, thereby centering "nothing" across the blank columns.
NOTE: Do not use Tab key.
C. Within two, three or more columns:
(1) Type item to be centered.
(2) Depress CENTER switch, holding it down until the pointer is within the last column before the Tab Stop desired to center to is reached.
NOTE: The machine will automatically stop at the very next Tab Stop after the CENTER switch is released.

III. *If desired to return the carriage before the end of the line, this may be done at any time by depressing J-Carriage Return switch*

IV. *Justified lines may be composed exactly as with the Blodgett or Sausele machines*

V. *Delete*

A. Deleting a centered column:
(1) Depress "Line Delete" panel switch.
(2) Depress CENTER switch.
(3) Move carriage back to Tab Stop to retype line.
NOTE: Any centering codes (#6 channel) in a deleted line must be "Code Deleted."
B. Deleting an entire line which contains centering work:
(1) Delete each column separately with a "Code Delete" superimposed over the 76 code.
(2) Code delete all centering codes (#6).
C. Line deleting a justified line:
(1) Same procedure as with Blodgett and Sausele machines.

REPRODUCER OR PHOTOGRAPHIC UNIT

I. *Placing tape in Reader*

A. Front Reader (Print Reader):

(1) Place tape in Print Reader at point where reader will be about to read the 76 code.

B. Back Reader (J Reader):

(1) Position tape in J-Reader at point where reader will be about to read the first centering code or 76 code, whichever comes first after the 76 code in the Print Reader.

II

Photo Unit must be at left hand margin before "Start Read" switch is depressed.

CIRCUITRY—KEYBOARD UNIT

With the example shown in FIGURES 5, 6 and 7 in mind, reference is now made to the keyboard circuitry diagrams comprising FIGURES 12 and 14A to 14F inclusive. These sheets of circuitry should be assembled in the manner shown in the diagram comprising FIGURE 12. These circuitry diagrams are devised according to current conventions, the switch contacts operated by the several relays being diagrammatically associated with those relays by dash lines.

A. *Full measure centering with no tab stops*

(1) With the Punch On switch depressed and the Non Just panel switch in the released position, the operator types the item to be centered and then depresses the CENTER switch.

(2) Pick up of Center Relay:

Minus D.C.; n.o. Punch On switch; CENTER switch; Just Relay contacts 3L and 2L; Center Relay coil; plus D.C.

(3) Pick up of Cross Over Relay:

Minus D.C.; Center Relay contacts 5L and 6L; Aux. JZR Relay contacts 1R and 2R; Cross Over Relay coil; plus D.C.

(4) Pick up of ACR Delay Relay:

Minus D.C.; Center Relay contacts 2R and 3R; Cross Over Relay contacts 12L and 11L; 200 ohm resistor; ACR Delay Relay coil; plus D.C.

(5) Pick up of ACR Relay:

Minus D.C.; ACR Delay Relay contacts 2L and 3L; ACR Relay coil; plus D.C.

(6) Pick up of One Shot Relay:

Minus D.C.; ACR Relay contacts 11R and 12R; One Shot Relay coil; plus D.C.

A holding circuit to the One Shot Relay is as follows:

Minus D.C.; One Shot Relay contacts 5L and 6L; Aux. ICR contacts 1L and 2L or No Code Relay contacts 3L and 4L; One Shot Relay coil; plus D.C.

Thus far, the text of the heading or other matter to be centered has been set up by appropriate punching of the tape by the means provided by the Blodgett installation; furthermore, the CENTER switch has been depressed resulting in the sequence of relays energized as described in steps 2 to 6 inclusive. The stage is now set for the next step in the automatic operation, which involves hole counting and feed hole punching up to the critical point of the thirtieth hole. Thus:

(7) If the hole counter (Relay HCM) has not reached the thirtieth hole count (according to its normal operation in the regular justification procedure) a circuit is set up to automatically pulse the hole counter as follows:

Minus D.C.; Aux. JZR Relay contacts 4L and 3L; Tab Stop Relay contacts 5L and 4L; (or Center Relay contacts 11L and 12L); ACR contacts 5L and 6L; Thirtieth Hole Relay contacts 4L and 3L; ARR Relay contacts 2 and 1; Hole Counter HCM coil; plus D.C.

The punch clutch magnet PCM operates in conjunction with the hole counter HCM as follows:

Minus D.C.; Aux. JZR contacts 4L and 3L; Tab Stop Relay contacts 5L and 4L (or Center contacts 12L and 11L); ACR contacts 5L and 6L; Thirtieth Hole Relay contacts 4L and 3L; Thirtieth Hole Relay contacts 7L and 6L; JCR contacts 11 and 12; n.c. Tape Feed switch; Punch Clutch coil PCM; plus D.C.

(8) When the hole counter HCM counts the thirtieth hole, a circuit to the thirtieth hole relay is as follows:

Minus D.C.; n.o. Punch On switch; HCT cam contacts 12 and 13; thirtieth hole relay coil; plus D.C.

At this point the hole counting and punching is completed and it is now desired to achieve an automatic spacing operation and punching the 6 code escapement impressions on the tape. Therefore, it is chosen to bring in the translator clutch TCM and translator clutch magnet number 3 (TM3).

(9) Since the hole counting stops on the thirtieth hole, a circuit is completed to the TCM and TM3 as follows:

Minus D.C.; Aux. JZR Relay contacts 4L and 3L; Tab Stop Relay contacts 5L and 4L (or Center Relay contacts 11L and 12L); ACR contacts 5L and 6L; Thirtieth Hole Relay contacts 4L and 5L; Aux. LDR contacts 2L and 1L; ACR contacts 2R and 3R and ACR contacts 5R and 6R; to TM3 coil and also to TCM coil; to plus D.C.

It has already been pointed out that the No. 3 code is the word space two-unit escapement described in the Blodgett patent, and therefore this condition of the circuitry results in a repeating translate action for yielding word space. Thus the carriage continually spaces over in increments of two units until the circuit is interrupted.

Now in accordance with the previously mentioned introduction of the newly adopted Centering code, namely, the 6 code, the punch circuit, during this continuous two-unit escapement is altered to punch a 6 code in lieu of the usual word space code 3 during this Centering procedure. Thus:

(10) Minus D.C.; n.o. Punch On switch; n.c. PLC; n.o. SCC operated by translator action; AAR Relay contacts 14 and 13; No Code Relay contacts 6L and 5L; n.o. contacts SC3 which had been closed by translator action on the No. 3 code; ACR Relay contacts 8R and 9R; PM6 coil; plus D.C.

(11) A circuit to the Justify Restore Magnet JRM (see FIGURE 47 of Blodgett Patent 2,700,447) is necessary to restore the computer to zero word spaces, thus:

Minus D.C.; Punch On switch; ACR Relay contacts 8L and 9L; JRM coil; plus D.C.

(12) The circuit to the Justify Space Magnet JSM (see FIGURE 43 of Blodgett 2,700,447) and word space contacts WSC is opened by contacts 7L and 8L on the ACR Relay.

Under these conditions the computer does not count any of the word spaces during the Centering operation.

The machine is now in a state of automatically spacing over two units at a time, and punching a 6 code for each two-unit escapement. Then,

(13) When the carriage reaches zero position, that is, at its right-hand limit, the Justify Zone contact JZC closes.

(14) Pick up of JZR Relay:

(This relay was introduced into the Blodgett circuitry but is not shown in the Blodgett patent. However, this relay serves to activate the Justification Zone Signal Lamp JZL of Blodgett and also figures prominently in the present novel Centering circuitry as will appear.) Then, the pick up circuit is as follows:

Minus D.C.; Punch On switch; n.o. JZC contact (operated); Diode CR10; RJZ Relay coil; plus D.C.

(15) Pick up of Aux. JZR Relay coil:

Minus D.C.; Punch On switch; n.o. JZC contacts (operated); diode CR11; Aux. LDR Relay contacts 8L and 7L; One Shot Relay contacts 2R and 3R; Thirtieth Hole Relay contacts 6R and 7R; Aux. JZR coil; plus D.C.

(16) Contacts 3L and 4L on the Aux. JZR Relay open the circuit to the translator clutch and translator No. 3 magnet, thus stopping the automatic two-unit escaping, as referred to above in connection with Step No. 9.

(17) Contacts 1R and 2R on Aux. JZR break the holding circuit to the Cross Over Relay, this circuit having been set up according to Step No. 3 above.

The timing of the operations at this point becomes rather important. When the translator clutch magnet TCM and the No. 3 translator magnet TM3 are pulsed, they immediately operate, but the translator cycle being a mechanical phase of the operation will take approximately 100 milliseconds to complete. There is minus D.C. current on the translator so long as it is not in the justification zone. At the time that the carriage closes the justification cam contact JZC and JZR relay picks up, justification zone has been reached, and the TCM and TM3 magnets lose their source of minus D.C. However, a new cycle of the translator has just begun, and it is necessary to allow time for the last word space translator cycle to be completed before continuing on with the automatic Centering sequence of operations. Therefore, a resistor-capacitor R–C Time Delay network is associated with the ACR Delay Relay coil which delays the release of the relay for about 200 milliseconds. Thus:

(18) Contacts 3R and 4R on the Aux. JZR break the holding circuit to the ACR Delay Relay, but there is a delay in breaking that circuit as mentioned above. Contacts 1L and 2L on the Aux. JZR break the escapement for the last word space. It is to be noted that the 6 code is punched in the tape, but there is no escapement for this last 6 cycle. In the reproducer or photographic unit this extra 6 code will be used as a control code or interlock code for the Print Reader and Justification Reader.

(19) After the 200 milliseconds time delay the ACR Delay Relay drops out thus dropping out the ACR Relay through contacts 2L and 3L on the ACR Delay Relay.

(20) Pick up of No Code Relay (for the purpose of opening a later described circuit):

Minus D.C.; One Shot Relay contacts 5R and 6R; ACR Relay contacts 11L and 10L; No code Relay coil; plus D.C.

At this point we have concluded the automatic cycle and are ready for the "end-of-line" code sequences 356–7–76. Thus:

(21) Pick up of Aux. Code Relay:

Minus D.C.; ACR Relays 11R and 10R; One Shot Relay contacts 2L and 3L (which are still energized); Code Relay coil; plus D.C.

(22) A circuit employed to punch the 356 code in the tape is set up as follows:

Minus D.C.; n.o. Punch On switch; n.c. PLC contacts; Aux. Code Relay contacts 6R and 5R; ARR Relay contacts 14 and 13 to a plug connection designated ACP27.

From ACP27, PM6 is energized through Aux. Code Relay contacts 8L and 9L; PM6 coil; plus D.C.

From ACP27, PM5 is energized through Aux. Code Relay contacts 5L and 6L; PM3 coil; plus D.C.

From ACP27; PM3 is energized through Aux. code contacts 2L and 3L; Cross Over Relay contacts 11R and 10R; PM3 coil; plus D.C.

The punch clutch magnet PCM is energized as follows:
Minus D.C.; n.o. Punch On Switch; n.c. PLC switch; Aux. Code Relay contacts 5R and 6R; ARR Relay contacts 3 and 4; PCM coil; plus D.C.

Thus, the code punched in the tape at this point is a 356 code but with no accompanying translator action and therefore no carriage return of the recorder at this point.

(23) Since the operation of the punch clutch is a mechanical operation and takes a predetermined amount of time to complete its cycle, Aux. Code Relay must remain energized during the punch cycle. Therefore to ensure the positive punching of the 356 code, a hold circuit on the Aux. Code Relay is set up as follows:

Minus D.C.; n.o. Punch On switch; n.c. PLC contacts; Aux. Code Relay contacts 6R and 5R; ARR Relay contacts 14 and 13; Diode CR12; Aux. Code Relay contacts 11R and 12R; Aux. Code Relay coil; plus D.C.

An alternative holding circuit would be as follows:

Minus D.C.; n.o. Punch On switch; n.o. PLC contacts closed during the punching operation; Diode CR14; Aux. Code Relay contacts 11L and 12L; Aux. Code Relay coil; plus D.C.

Therefore, once energized, the Aux. Code Relay is not allowed to drop out until after the PLC contacts pick up the ARR Relay and return to normal position, thus ensuring positive punching of the 356 code.

If the operator happened to have the CENTER switch depressed all this time, there is a holding circuit on the Aux. Code Relay which momentarily stops the Centering sequence of operation until the switch is released. This circuit would be as follows:

(24) Minus D.C.; Center Relay contacts 6R and 5R; Aux. Code Relay contacts 3R and 2R; Aux. Code Relay coil; plus D.C.

The next few steps lead into the Blodgett Automatic Justification cycle and are as follows:

(25) Pick up of Aux. ICR Relay:

Minus D.C.; n.c. CRTC contacts; Aux. CRTC contacts 3L and 4L; No Code Relay contacts 1L and 2L; Diode CR7; JZR Relay contacts 2 and 3; JZR contacts 6 and 5; Diode CR9; Aux. Code Relay contacts 8R and 9R; Aux. ICR Relay coil; plus D.C.

(26) Drop out of One Shot Relay:

Contacts 1R and 2R on the Aux. ICR open and contacts 3L and 4L on the No Code Relay open, thus breaking the holding circuit to the One Shot Relay coil (See Step No. 6 above.)

Contacts 1L and 2L on the No Code Relay comprise a "preliminary make" set of contacts. Therefore, making before contacts 3L and 4L break, to ensure positive pick up of the No Code Relay.

(27) Pick up of ICR Relay:

After the positive punching of the No. 356 Code and after the One Shot Relay drops out, the Aux. Code Relay drops out. A circuit is then completed to the ICR Relay as follows:

Minus D.C.; n.c. CRTC; Aux. CRTC contacts 3L and 4L; No Code contacts 1L and 2L; Diode CR7; JZR contacts 3 and 2; JZR contacts 6 and 5; Diode CR9; Aux. Code contacts 8R and 7R; Aux. ICR contacts 8L and 9L; ARR contacts 7 and 8; ICR coil; plus D.C.

Now the machine is conditioned to move into the Blodgett Automatic Justification cycle and the next step is the punching of the Interlock Code 7. This circuit would be as follows:

(28) Minus D.C.; n.c. CRTC; Aux. CRTC Relay contacts 3L and 4L; No Code Relay contacts 1L and 2L (preliminary make) Diode CR7; JZR Relay contacts 3 and 2; JZR Relay contacts 6 and 5; n.c. J-Carriage Return switch; ICR Relay contacts 17 and 16; Thirteenth Hole Relay contacts 7L and 8L; One Shot Relay contacts 7L and 8L; PM7 and PCM; plus D.C.

The next step reverts to the Blodgett Automatic Justification cycle and ordinarily involves the punching of the Justification code which of course includes the codes 7 and 6 together with selected combinations of the other numbered codes appropriate to the justification of a line. In this procedure, however, the bare code 76 is employed without further numerical code punchings. Because the automatic centering procedure escapes in increments of two units, there is the possibility of over-shooting the zero mark by one unit.

(29) Therefore, when the computer code seekers come forward on the number 76 code, contacts 5L and 6L on the No Code Relay break the circuit to Punch Magnets PM1–PM5 inclusive so as not to punch a Line Delete code (1234567). All seekers will then come forward because the carriage is actually out of justification range. The computer had been restored to zero and no word spaces counted during the centering operation. Contacts 1L and 2L on the No Code Relay through Diode CR7 with contacts 2 and 3 on the JZR Relay hold the minus D.C. current on the center strap of the J-Carriage Return switch.

The third step of the Blodgett Justification cycle is the Carriage Return operation.

(30) Although the carriage returns at the next point beyond the 76 code, the carriage return code itself is not punched into the tape. Contacts 5L and 6L on the No Code Relay break the circuit to the punch magnets (PM1–PM6 inclusive).

(31) n.c. CRTC contacts open during carriage return operation dropping out the JZR Relay, the CRR Relay and the Aux. JZR Relay.

(32) The No Code Relay drops out. Selector Slide contacts SCC, SC3, SC5, and SC6 close during carriage return operation. The No Code Relay must not drop out until after the Selector Slide contacts open. The CRTC contacts open up while the Selector Slide contacts are still closed.

Therefore, two holding circuits prevail:
One is through the n.c. CRTC contacts.
The second:

Minus D.C.; Punch On switch; n.c. PLC contacts; SCC switch (closed during Selector Slide operation); ARR Relay contacts 14 and 13; No Code Relay contacts 6L and 7L; Diode CR6; No Code Relay coil; plus D.C.

When the selector common contact switch SCC opens, there is no more possibility of a number 356 code being punched in the tape, therefore, the No Code Relay drops out.

Thus, the procedure for Centering across full measure is completed.

B. *Centering with tab stops in place*

(33) Steps 1 through 12 inclusive as described above in connection with Full Measure Centering are repeated for Tabular Centering.

(34) The recorder machine is now in a state of automatically spacing over two units at a time and punching a number 6 code for each two-unit escapement.

(35) As the carriage passes a tap stop setting (see FIGURES 9A to 9D) the tab stop switch closes and the tab stop relay picks up as follows:

Ground; Tab Stop switch; Cross Over Relay contacts 8L and 9L; Aux. LDR Relay contacts 4L and 5L; Tab Stop Relay coil; minus 24 volts D.C. from source in the upper-right corner of FIGURE 14E.

Diode CR13 suppresses the Tab Stop Relay coil so as not to cause arcing at the Tab Stop switch.

(36) If the CENTER switch is held depressed by the operator while the carriage passes a tab stop (tab stop switch closes) the automatic spacing continues with no interruption, as follows:

Minus D.C.; Aux. JZR Relay contacts 3L and 4L; Center Relay contacts 12L and 11L; ACR Relay contacts 5L and 6L; Thirtieth Hole Relay contacts 4L and 5L; Aux. LDR Relay contacts 2L and 1L; ACR Relay contacts 2R and 3R and ACR Relay contacts 5R and 6R; the first of these circuits going to TM3 coil and thence to plus D.C.; and the second of these circuits going to the Translator Clutch Magnet TCM and thence to plus D.C.

(37) ACR Delay Relay is held energized by its pick-up circuit:

Minus D.C.; Center Relay contacts 2R and 3R; Cross Over Relay contacts 12L and 11L; 200 ohm resistor; ACR Delay Relay coil; plus D.C.

(38) However, if the CENTER switch has been released by the operator before a tap stop has been reached, the automatic two-unit spacing by 6 codes is stopped when the carriage reaches the next tab stop.

(39) Tab Stop Relay picks up by the same circuit described in step 35 above.

(40) Contacts 5L and 4L on the Tab Stop relay open the circuit to the TM3 Magnet and the Translator Clutch TCM.

(41) Contacts 2L and 1L on the Tab Stop Relay open the holding circuit to the ACR Delay Relay however, the resistor-capacitor time delay network delays the release of the relay for approximately 200 milliseconds.

(42) Contacts 11R and 12R on the Tab Stop Relay open the circuit to the Escapement Magnets for the last Translator cycle of word space.

This latter step is important since it permits the last 6 code to be punched in the tape, but there is no escapement for the last cycle.

(43) Contacts 2L and 3L on the ACR Delay Relay open after the 200 millisecond delay and hence drops out the ACR Relay.

(44) Pick up of No Code Relay:

Minus D.C.; One Shot Relay contacts 5R and 6R; ACR Relay contacts 11L and 10L; No Code Relay coil, plus D.C.

(45) Pick up of Aux. Code Relay:

Minus D.C.; ACR Relay contacts 11R and 10R; One Shot Relay contacts 2L and 3L; Aux. Code Relay coil; plus D.C.

Next, circuits to punch the tab code 256 are as follows:

(46) Minus D.C.; n.o. Punch On switch; n.c. PLC; AUX. Code Relay contacts 6R and 5R; ARR Relay contacts 14 and 13 to jack or plug ACP27; then—

(a) from ACP27 Punch Magnet PM6 is energized through Aux. Code Relay contacts 8L and 9L to PM6 coil; plus D.C.

(b) from ACP27 the PM5 Punch Magnet is energized through Aux. Code Relay contacts 5L and 6L; PM5 coil; plus D.C.

(c) from ACP27 the PM2 Magnet is energized through Aux. Code Relay contacts 2L and 3L; Cross Over Relay contacts 11R and 12R (Cross Over Relay has not dropped out); PM2; plus D.C.

(47) The Punch Clutch PCM is energized as follows:

Minus D.C.; n.o. Punch On switch; n.c. PLC contacts; Aux. Code Relay contacts 5R and 6R; ARR Relay contacts 3 and 4; PCM coil, plus D.C.

Thus, the next code in the tape is a number 256 code with no translator action.

(48) Pick up of Aux. ICR Relay:

Minus D.C.; n.o. Punch On switch; n.c. PLC contacts; JZR Relay contacts 4 and 5; Diode CR9; Aux. Code Relay contacts 8R and 9R; Aux. ICR Relay coil; plus D.C.

It is to be noted at this point that contacts 7R and 8R on the Cross Over Relay open the circuit to the TM3, TM5, and TM6 Translator Magnets; therefore, there will be no Carriage Return operation on Tabular Centering.

(49) Drop out of One Shot Relay:

Contacts 1R and 2R on the Aux. ICR Relay open and contacts 3L and 4L on the No Code Relay open, thus breaking the holding circuit to the One Shot Relay coil; contacts 1L and 2L on the No Code Relay comprising a "preliminary make" set of contacts, therefore making before contacts 3L and 4L break to ensure positive pick up of the No Code Relay.

(50) Pick up of ICR Relay:

After the punching of the 256 code and after the One Shot Relay drop out, the Aux. Code Relay drops out. A circuit is completed to the ICR Relay coil as follows:

Minus D.C.; n.o. Punch On switch; n.c. PLC contacts; JZR Relay contacts 4 and 5; Diode CR9; Aux. Code Relay contacts 7R and 8R; Aux. ICR Relay contacts 8L and 9L; ARR Relay contacts 7 and 8; ICR coil; plus D.C.

(51) When ICR Relay picks up, a circuit is completed to the Blodgett Automatic Justification cycle; thus:

Minus D.C.; n.o. Punch On switch; n.c. PLC contacts; JZR Relay contacts 4 and 5; n.c. J-Carriage Return switch; ICR Relay contacts 17 and 16, etc., as the machine goes through its automatic cycling as fully explained in the Blodgett patent and also above in connection with the description of the Full Measure Centering procedures.

Now because there is no carriage return operation when centering to a tab stop, there is no CRTC opening; therefore, a set of contacts on the Aux. CRTC Relay in series with the CRTC contacts is necessary to drop out on centering and computing relays, thus:

(52) Minus D.C.; Aux. CRR; Relay contacts 2R and 3R; Cross Over Relay contacts 3R and 2R; Aux. CRTC Relay coil; plus D.C.

(53) Contacts 3L and 4L on the Aux. CRTC Relay open the holding circuit to the Cross Over Relay, the CRR Relay, and the No Code Relay. There is a holding circuit on the Aux. CRTC Relay to ensure positive drop out of all relays before the Aux. CRTC Relay drops out, as follows:

Minus D.C.; Cross Over Relay contacts 5R and 6R; Aux. CRTC Relay contacts 1L and 2L; Aux. CRTC Relay coil; plus D.C.

Minus D.C.; No Code Relay contacts 8L and 9L; Aux. CRTC Relay contacts 1L and 2L; Aux. CRTC Relay coil; plus D.C.

Minus D.C.; Aux. CRR Relay contacts 5L and 6L; Aux. CRTC Relay contacts 1L and 2L; Aux. CRTC Relay coil; plus D.C.

Minus D.C.; Aux. ICR Relay contacts 5L and 6L; Aux. CRTC Relay contacts 1L and 2L; Aux. CRTC coil; plus D.C.

C. *J-carriage return.*

(54) If the carriage is in the justification zone, there is a minus D.C. circuit to the center strap of the J-Carriage Return Panel switch as follows:

Minus D.C.; n.o. Punch On switch; JZC switch (closed when in justification zone); Diode CR10; JZR Relay contacts 6 and 5; to center strap of J-Carriage Return switch.

(55) If the carriage has not entered the justification zone, there is a minus D.C. circuit to the center strap of the J-Carriage Return Panel switch as follows:

Minus D.C.; n.o. Punch On switch; n.c. PLC contacts; JZR Relay contacts 4 and 5 (JZR not energized); to center strap of the J-Carriage Return switch.

Now the operator may depress the J-Carriage Return switch and the following operations occur:

(56) Pickup of Aux. Code Relay:

Minus D.C. on center strap of J-Carriage Return switch; n.o. J-Carriage Return switch; ICR Relay contacts 2 and 1; Just Relay contacts 5L and 6L; cross Over Relay contacts 5L and 4L; Aux. Code Relay coil; plus D.C.

(57) The circuit to punch the 356 code (Carriage Return) is exactly as explained above in step No. 22 and following.

(58) Pick up of Aux. ICR Relay:

Minus D.C. on center strap of J-Carriage Return switch; Diode CR9; Aux. Code relay contacts 8R and 9R; Aux. ICR coil; plus D.C.

Now the operator releases the J-Carriage Return panel switch, and—

(59) ICR Relay picks up as follows:

Minus D.C. on center strap of J-Carriage Return switch; Diode CR9; Aux. Code Relay contacts 8R and 7R; Aux. ICR contacts 8L and 9L; ARR contacts 8 and 7; ICR Relay coil; plus D.C.

(60) Next the Automatic Justification cycle provides the necessary tape feed, punches the interlock code 7, the number 76 code, and returns the carriage.

(61) If the operator depresses the J-Carriage Return switch again, contacts 1 and 2 on the ICR Relay prevent another punching of the number 356 code.

(62) On the third step of the Justification cycle, Relay CRR picks up by way of the Blodgett circuit thus:

Minus D.C. on center strap of J-Carriage Return switch; HCB cam operated contacts 2 and 1 (associated with hole count Relay HCM); ARR Relay contacts 17 and 18; JCR Relay contacts 4 and 5; CRR coil; plus D.C.

(63) Pick up of Aux. CRR Relay:

Minus D.C. (from left-hand source in FIGURE 14B); CRR Relay contacts 7 and 8; Aux. CRR Relay coil; plus D.C.

(64) Contacts 4R and 5R on the Aux. CRR Relay break the holding circuit to the Aux. ICR Relay thus causing the Aux. ICR Relay to drop out.

(65) Pick up of No Code Relay:

Minus D.C.; n.c. CRTC; Aux. CRTC contacts 3L and 4L; Aux. ICR contacts 2L and 1L; Aux. CRR contacts 2L and 3L; No Code Relay coil; plus D.C.

Therefore, when the carriage returns, the associated code 356 will not punch into the tape. Contacts 5L and 6L on the No Code Relay open the circuit to the Selector Slide contacts.

(66) The carriage return movement operates the CRTC switch which drops out all relays.

D. *Line deleting a centered line*

(67) The operator depresses LINE DELETE panel switch. Line Delete Relay LDR picks up as follows:

Minus D.C.; n.o. Punch On Switch; Line Delete switch; LDR coil; plus D.C.

(68) Pick up of Aux. LDR:

Minus D.C.; n.o. Punch On switch; LDR Relay contacts 15 and 14; Aux. LDR coil; plus D.C.

(69) Operator depresses CENTER switch:

Center Relay, Cross Over Relay, ACR Delay Relay, ACR Relay and One Shot Relay all pick up. The hole counter HCM steps up to the thirtieth hole count and the thirtieth hole relay picks up. This is explained in detail in steps 2–8 inclusive above in connection with full measure centering.

(70) When the thirtieth hole relay picks up, a circuit is completed to the Tab Stop Relay as follows:

Ground; 30 Hole Relay contacts 4R and 5R; Aux. LDR contacts 5L and 6L; Tab Stop Relay coil; minus 24 volts D.C.

(71) If the CENTER switch is held depressed by the operator, ACR Relay does not drop out, but contacts 1L and 2L on the Aux. LDR Relay open the circuit to the Translator Clutch and the Translator Magnet TM3, thus preventing the automatic escapement action.

(72) When the CENTER switch is released and the Tab Stop Relay energized, contacts 2L and 1L on the Tab Stop Relay open the holding circuit to the ACR Delay Relay, thus dropping it out; and then contacts 2L and 3L on the ACR Delay Relay open the circuit to drop out the ACR Relay.

(73) The machine automatically proceeds through the same sequence of operation as explained for tabular centering as set forth in steps 44–51 inclusive above. Note that the Line Delete code is punched in the tape.

(74) Pick up of Aux. CRTC Relay:

Because there is no carriage return operation, contacts CRTC do not actuate, therefore a pulse picks up the Aux. CRTC Relay as follows:

Minus D.C.; Aux. CRR Relay contacts 2R and 3R; Cross Over Relay contacts 3R and 2R; Aux. CRTC coil; plus D.C.

(75) Contacts 3L and 4L on the Aux. CRTC Relay open the holding circuit to release LDR, JZR, CRR, Cross Over and No Code.

(76) There is a holding circuit on the Aux. CRTC Relay to ensure positive drop out of all relays before the Aux. CRTC drops out:

Minus D.C.; Cross Over Relay contacts 5R and 6R; Aux. CRTC Relay contacts 1L and 2L; Aux. CRTC coil; plus D.C.

Minus D.C.; No Code Relay contacts 8L and 9L; Aux. CRTC Relay contacts 1L and 2L; Aux. CRTC coil; plus D.C.

Minus D.C.; Aux. CRR Relay contacts 5L and 6L; Aux. CRTC Relay contacts 1L and 2L; Aux. CRTC coil; plus D.C.

Minus D.C.; Aux. LDR Relay contacts 2R and 3R; Aux. CRTC Relay contacts 1L and 2L; Aux. CRTC coil; plus D.C.

Minus D.C.; Aux. ICR Relay contacts 5L and 6L; Aux. CRTC Relay contacts 1L and 2L; Aux. CRTC coil; plus D.C.

E. *Keyboard unit Reader operation*

The use of the Reader on the keyboard unit is particularly adaptable to recut a tape containing centered and/or justified composition.

(77) The tape is placed in the keyboard reader, the NON JUST panel switch is in the "Up" position, and the START READ panel switch is depressed.

(78) Pick up of RCR Relay:

Minus D.C.; n.c. CRTC Aux. CRTC Relay contacts 3L and 4L; n.c. BSC; RTC contacts; START READ panel switch (which is depressed); n.c. STOP READ switch; RCR Relay coil; plus D.C.

(79) The line is read and typed and a new tape is punched. If there are any 6 codes (for centering purposes) present in the tape, the keyboard Reader reads right through them as if they were code deletes or tape feed.

(80) The next code is a Carriage Return code 356 or a Tab code 256. Not wishing to carriage return or tab at this time, a circuit to bring in translator magnet TM1 is as follows (a code 1356 or 1256 of course does not exist, therefore the carriage remains motionless):

Minus D.C.; n.c. CRTC; Aux. CRTC Relay contacts 3L and 4L; n.c. BSC; RTC contacts; n.c. RC7; n.o. RC6 (operated); n.o. RC5 (operated); n.c. RC4; n.c. RC1; Just. Relay contacts 2R and 3R; Translator Magnet TM1; plus D.C.

(81) The next code is of course the Interlock code 7. LR Relay picks up:

Minus D.C.; n.c. CRTC; Aux. CRTC Relay contacts 3L and 4L; n.c. BSC contacts; RTC contacts; n.o. RC7 (operated); n.c. RC6; LR Relay pick up coil; plus D.C.

(82) RCR is held energized through the following circuit:

Minus D.C.; LR Relay contacts 1 and 2; n.c. Reader contacts on RC4, or RC5, or RC6; RCR Relay contacts 3 and 4; n.c. STOP READ switch; RCR Relay coil; plus D.C. With LR Relay picked up, contacts 1 and 2 on the LR Relay drop out the RCR Relay.

(83) The Reader RM is energized through the following circuit to take another read:

Minus D.C.; n.c. CRTC; Aux. CRTC contacts 3L and 4L; n.c. BSC; RTC contacts; n.c. START READ switch; DCR Relay contacts 2 and 1; LR Relay contacts 15 and 16; Reader Clutch Magnet RM; plus D.C.

(84) Next code is the 76 code. Pick up of DCR Relay as follows:

Minus D.C.; n.c. CRTC; Aux. CRTC contacts 3L and 4L; n.c. BSC; RTC contacts; operated n.o. contacts; RC7 (operated); n.o. contacts RC6; DCR Relay coil; plus D.C.

(85) Contacts 1 and 2 on the DCR Relay break the circuit to the Reader Clutch Magnet RM, therefore automatically stopping Reader operation.

(86) The operator at this point may center or justify the line.

(87) When recutting a non-justified tape (Non-Justify panel switch depressed) contacts 1R and 2R on the Just Relay permit the carriage return and tab functions to occur exactly as intended.

This concludes the various operations of the Keyboard or Recorder unit A as involved in Automatic Centering procedures.

*Circuitry—Reproducer or photo unit only*

Still following FIGURES 5, 6 and 7 and considering FIGURES 15A–15D assembled as indicated in FIGURE 13, the operation of the reproducer will be clearly understood from the following descriptions:

(1) The tape is started with the J-Reader about to read the first number 6 (centering) code and the Print Reader about to read the 76 code.

(2) Depress "START READ" switch which effects pick up of JRR Relay through the following circuit:

Minus D.C.; JRTC; PRTC; n.o. START READ panel switch: PRR Relay contacts 3 and 4; n.c. NON-JUST switch; n.c. END LINE switch; JRR Relay coil; plus D.C.

(3) J-Reader energized:

Minus D.C. through JRTC and PRTC; n.c. START READ switch; SIR Relay contacts 2 and 1; CRTC; Diode CR9; JRR Relay contacts 3 and 4; J-Reader Magnet coil; plus D.C.

The J-Reader begins reading; the first code it reads being a number 6 code.

(4) The J-Reader reading the first centering code utilizes the following circuit which picks up the JC1 Relay:

Minus D.C. through JRTC and PRTC; n.c. JRC7; n.o. JRC6 (closed during J read of a 6 code in tape); n.c. JRC2; n.c. JRC3; n.c. JRC4; n.c. JRC5; n.c. JRC1; JC2 contacts 2 and 1; JC1 Relay coil; plus D.C. (Note that JC2 does not pick up due to the fact that it has minus 90 volts impressed at both terminals; therefore no voltage potential difference across this relay.)

(5) The holding circuit on the JRR Relay is as follows:

Minus D.C. through JRTC and PRTC; n.c. JC1 Relay contacts 4 and 5; n.c. JRC7 contacts; JRR Relay contacts 1 and 2; JRR Relay coil; plus D.C.

Contacts 4 and 5 on the JC1 Relay open said holding circuit to the JRR Relay. However, if the Print Reader is not operating there is another holding circuit to the JRR Relay as follows:

Minus D.C. through JRTC and PRTC; PRR contacts 6 and 5; JRR contacts 5 and 6; n.c. NON JUST switch; n.c. END LINE switch; JRR Relay coil; plus D.C.

(6) When the read is over, JRC6 contacts open and JC2 Relay picks up and holds as follows:

Minus D.C. through JRTC and PRTC; n.c. JRC7; JC1 contacts 2 and 3; JC2 Relay coil; JC1 Relay coil; plus D.C.

JC1 Relay and JC2 Relay are 45 volt relays; therefore, 90 volts across both relays in series allow both relays to pick up (or remain operated if already energized as in the case of JC1.)

(7) The subsequent 6 codes after the first one read by the J-Reader pick up the CE Relay:

Minus D.C. through JRTC and PRTC; n.c. JRC7; n.o. JRC6 (operated when reading a 6 code); n.c. JRC2; n.c. JRC3; n.c. JRC4; n.c. JRC5; n.c. JRC1; JC2 contacts 2 and 3; CE Relay coil; plus D.C.

(8) Pick up of EM1:

Minus D.C.; CE contacts 11 and 12; EM1 Magnet coil; plus D.C.

(9) Pick up of the escapement solenoid (see item 455 of Sausele patent):

Minus D.C.; CE contacts 5 and 4; escapement solenoid coil; plus D.C.

(10) When the read cycle is over, JRC6 opens; CE Relay drops out, escapement solenoid deenergizes and the result is a one-unit escapement. Therefore, there is a one-unit escapement (directly from the J-Reader) for every centering code 6 after the first centering code.

(11) The code following the series of centering codes is either a 356 (carriage return) or a 256 (tab) code depending upon whether the line was centered across the full measure or to a tab stop. If the code is a 356 code, a circuit to the TC Relay is as follows:

Minus D.C. through JRTC and PRTC; n.c. JRC7; n.o. JRC6 (operated); n.c. JRC2; n.o. JRC3 (operated); JC1 contacts 1 and 13; TC Relay coil; plus D.C. J-Reader contacts JRC6 and JRC3 are operated during the reading of a 356 code. If the code was a 256 code the TC Relay does not pick up.

(12) Following the 356 or 256 code is a 7 code. The n.c. JRC7 (operated) reader contacts break the holding circuit to JC1 Relay and JC2 Relay thus dropping them out. The 7 code read in the J-Reader also stops the J-Reader; however, if the Print Reader is idle there is another holding circuit to the J-Reader as explained in step 5.

(13) Following the 7 code, the J-Reader reads a 76 code. With the reading of the 76 code four circuits are activated:

(a) PRR Relay picks up as follows:

Minus D.C. through JRTC and PRTC; JC1 Relay contacts 4 and 5; n.o. JRC7 (operated); n.o. JRC6 (operated); Diode CR5; PRR Relay coil; plus D.C.

Thus Print Reader operation is initiated through:

Minus D.C. through JRTC and PRTC; n.c. START READ switch; SIR Relay contacts 2 and 1; n.c. CRTC; n.c. BSC; Diode CR8; PPR contacts 8 and 9; DCR contacts 2 and 1; Print Reader Magnet PRM coil; plus D.C.

(b) A holding circuit on the JRR Relay is as follows:

Minus D.C. through JRTC and PRTC; JC1 Relay contacts 4 and 5; n.o. JRC7 (operated); n.o. JRC6 (operated); Diode CR6; JRR Relay contacts 1 and 2; JRR Relay coil; plus D.C. (Thus the J-Reader is kept in operation.)

(c) If the previous line of type had been deleted by a line delete code (7612345) a circuit is completed to the COR Relay as follows:

Minus D.C. through JRTC and PRTC; JC1 Relay contacts 4 and 5; n.o. JRC7 (operated); n.o. JRC6 (operated); Diode CR7; n.o. JRC2 (operated); n.o. JRC4 (operated); n.o. JRC5 (operated); n.o. JRC3 (operated); n.o. JRC1 (operated); Diode CR19; COR Relay coil; plus D.C.

(d) If the line was justified, i.e. has a justification code along with the 76 code, the reading of the 76 code through diode CR7 picks up the respective justification storage relays through operation of JRC1, JRC2, JRC3, JRC4 or JRC5.

(14) The first code read by the Print Reader is a 76 code. Then the Print Reader reads and imprints (or photographs) the item to be centered. Following the items to be centered is the possibility of some feed holes, and then the series of 6 (centering) codes.

(15) Pick up of PR6 Relay:

Minus D.C. through JRTC and PRTC; COR Relay contacts 1 and 2; n.c. PRC7; n.o. PRC6 (operated); Diode CR18; TC contacts 11 and 12; PR6 Relay coil; 1.5K ohm resistor; plus D.C.

(Note that TC Relay was not energized when the J-Reader read the 256 code after its centering code; therefore, contacts 11 and 12 remain closed.)

The PR6 Relay is a 45 volt Relay. If some other code is read in the Print Reader with the 6 code at any time, minus D.C. through diodes CR13, CR14, CR15, CR16, CR17 or CR18 is present on both sides of the PR6 Relay coil; thus, with no voltage difference across the relay, it does not pick up.

(16) Pickup of RC1 Relay. (The Print Reader has read the first 6 centering code; and PR6 has picked up):

Minus D.C.; PR6 contacts 2 and 3; RC2 Relay contacts 2 and 1; RC1 Relay coil; plus D.C.

Contacts 4 and 5 on the RC1 Relay reset the Blodgett counting maze to zero.

(17) Pick up of RC2 Relay. When the read of the first 6 code is completed, SPR6 opens, PR6 Relay drops out and its contacts 2 and 3 open. Circuit to RC2 is completed as follows:

Minus D.C. through PRTC and JRTC; n.c. PRC7; RC1 Relay contacts 2 and 3; RC2 Relay coil; RC1 Relay coil; plus D.C.

The RC1 Relay and RC2 Relay are 45 volt relays, therefore 90 volts across both relays in series is sufficient to energize both of them.

(18) Print Reader reads the second 6 centering code, PR6 picking up;

Minus D.C.; PR6 contacts 2 and 3; RC2 contacts 2 and 3; SDR contacts 15 and 16; junction TA75

... from TA75; Diode CR10; to WSR Relay coil; plus D.C. (thus activating the Blodgett counting maze) (see FIGURE 71B and columns 51 and 52 of Blodgett 2,700,447).

... from TA75; Diode CR11; RJ3 Pick Up coil; plus D.C.

... from TA75; Diode CR12; RJ5 Pick Up coil; plus D.C.

In other words, the first number 6 code read in the Print Reader restores the computer. The second, third, fourth, fifth, sixth and seventh centering codes 6 pick up justification storage relays RJ3 and RJ5 and count the 6 centering codes into the counting maze. After the seventh centering code, the step down relay picks up, as also described in the Blodgett patent 2,700,447. The eighth centering code and the remaining centering codes in that column, as read by the Print Reader, will be directed to pick up the CE Relay, energizing of which pulses the escapement solenoid with the EM1 escapement magnet yielding a one-suit escapement.

Pick up of CE Relay:

Minus D.C.; PR6 contacts 2 and 3; RC2 Relay contacts 2 and 3; SDR contacts 15 and 16; CE Relay coil; plus D.C.

Pick up of EM1 Magnet:

Minus D.C.; CE Relay contacts 12 and 11; EM1 Magnet coil; plus D.C.

Pick up of Escapement Solenoid:

Minus D.C.; CE Relay contacts 5 and 4; escapement solenoid coil; plus D.C.

(It will be realized that the escapement solenoid, designated 455 in the Sausele patent disclosure, is peculiar to that photographic composing installation; however, the present centering system is to be generically considered and in this sense the CE Relay may be taken as the primary element for accomplishing the one-unit escapement operation, since in the phototypesetter installation it serves to actuate both the one-unit escapement magnet EM1 and the escapement solenoid; however, in the Blodget installation it could accomplish the desired escapement by bringing in the translator and the key lever actuation for a non-printing character coded to effect one unit of escapement, and this relay could of course perform the same function in any other writing or composing machine by appropriate electro-magnetic connections to the escapement devices.)

(19) This maneuver is necessary in case a line might be centered over a few tab stops. The J-Reader reading the 6 centering codes, spaces half the excess area. The Print Reader then reads the item to be centered. Ordinarily, the Print Reader will not respond to number 6 codes and its next translation code will be a tab. Depending upon the job being centered, there is the possibility of one or more tab stop settings before the correct tab stop that the column is being centered to. Hence the tab code would bring the carriage to the wrong tab stop. To eliminate this possibility of erratic operation, the circuit is designed to have the Print Reader also escape one unit on all but seven of the centering codes, thereby positioning the carriage six or seven units from the correct tab stop. Now, when the Print Reader reads the tab code after the series of centering codes, the carriage tabs to the correct tab stop.

(20) If there is a carriage return code 356 following the series of six centering codes, there is no need for the Print Reader to escape one unit on the 6 codes because it is going to carriage return. Contacts 11 and 12 on the TC Relay open the circuit for any PR6 pick up, and hence bypass any Print Reader one unit escaping.

(21) The print Reader reads a number 7 code next. The n.c. PRC7 contacts open the holding circuit to Relays RC1, RC2 and TC, thereby dropping them out. The 7 code also stops the Print Reader by breaking the holding circuit to the PRR Relay.

(22) With both J-Reader and Print Reader operating, if the J-Reader reads a 7 code or a 6 centering code before the Print Reader finishes a line, the J-Reader will automatically stop. (In connection with these steps, reference should be made to the diagrams or charts in FIGURES 8 and 11 of the drawings.) When the Print Reader finishes imprinting (or photographing) the line and reads the 7 code, the circuit to the PRR Relay is opened, and hence the circuit to the Print Reader Magnet PRM is opened, thus the Print Reader operation stops. Also, the 7 code read in the Print Reader pulses the J-Reader. The J-Reader reads a series of 6 centering codes then reads the 76 code and starts Print Reader operation. In a justified line, the centering codes 6 are not present.

If a condition arises where the Print Reader finishes reading and photographing a line before the J-Reader reads the next justification code or centering code, then the Print Reader will stop operation when it reads the 7 code.

(23) When the Print Reader reads and then translates a tab or carriage return, contacts CRC open, thus temporarily halting Print Reader and J-Reader operation until the carriage completes its tab or carriage return. The reason for this alteration to the Blodgett circuit is that the J-Reader must not start one-unit escaping while the carriage is in the process of tabbing or carriage return.

Since the present invention comprises improvements applicable to automatic composing systems of a wide variety of types, whether a justifying typewriter such as featured in the several Blodgett patents to which reference has been made, or a photographic typesetter which is the subject of the Sausele patent, it is understood that the language of the specification and the claims must be interpreted in a generic sense; for example the term "imprinting" or "composing" as applied to the presentation of the text characters is intended to cover typewriting, photographic typesetting or any other means of making legible text composition.

The term "carriage" as employed herein, unless otherwise specifically restricted, shall be interpreted broadly to mean any instrumentality for receiving imprints of composition by whatever means and susceptible of relative incremental movement with respect to the means in either principal unit for imparting or projecting said composition, either for spacing or for such imprinting.

Also, it is conceivable that the other coded devices than a punched tape may be employed in the automatic operation of the reproducer, so that the words "tape" and "punch" and its derivatives are to be interpreted herein in a generic sense as covering any suitable coded means and processes for producing it.

Furthermore, the terms "J-Reader" and "justification reader" are employed herein to designate, not only a justification reader such as disclosed in the Blodgett and Sausele patents, but any similar reader usable in collaboration with the print reader, but reading no text characters but only operational codes, and whether or not justification is involved.

It is further understood that various changes and modifications may be made in the embodiment of the invention illustrated and described herein without departing from the scope of the invention as defined by the subjoined claims.

Having thus described the invention, what is claimed as new and desired to be secured by Letters Patent is:

1. In an automatic typographic composing system of the class described, apparatus for automatically preparing centered copy as for headings or columnar texts, said apparatus comprising a recorder which includes a keyboard and a punch for punching both character codes and functional-control codes into a tape in response to the operation of the keyboard; and a reproducer which includes a carriage for carrying a medium to receive the composition, and a double tape-code-reading device for reading both character and functional-control codes; and imprinting means for producing copy in response to the codes read in the tape; means in said recorder for coding into the tape the extent of total blank space representing the difference in extent of the line of text and the total extent of the area across which the text is to be centered; and means in the reading device of the reproducer to divide said total coded space in half, and escape said carriage to this half-distance before imprinting the text of said line.

2. In an automatic typographic composing system of the class described, apparatus for automatically preparing centered copy as for headings or columnar texts, said apparatus comprising a recorder which includes a keyboard and a punch for punching both character codes, and functional-control codes into a tape in response to the operation of the keyboard; and a reproducer which includes a carriage for carrying a medium to receive the composition, a double tape-code-reading device consisting of a first reader primarily for reading functional-control codes, and a second reader primarily for reading character codes; and imprinting means for producing copy on said medium in response to the codes read from the tape; means in said recorder for repeatedly punching a unique code in the tape for each escapement increment, each increment composed of an even number of units, up to the total extent of blank space representing the difference in extent of the line of text and the total extent of the area across which the text is to be centered; and means in the reading device of the reproducer to divide each of said punched escapement increments in half and cause the carriage to escape through the same number of half-increments as the original increments punched, prior to imprinting the text of the line according to the character codes punched.

3. The apparatus as set forth in claim 2 in which said punch in the recorder is adapted to punch the character codes of the text of the line into the tape first and then automatically to punch the series of codes representing the blank space increments; whereas the first reader in the reproducer reading device is adapted to read the later occurring increment codes before the second reader reads the character codes; and in which there are provided means actuated by the first reader for starting the character code reading by said second reader when the first reader reaches the end of the series of space increment codes.

4. The apparatus as set forth in claim 3 in which means are provided for causing the first reader to proceed along the tape up to the next succeeding series of space increment codes for the next portion of centered text, while said second reader is reading and escaping the carriage for imprinting the text of said first portion.

5. The apparatus as set forth in claim 4 in which means are provided in the recorder for punching measure-ending coding in the tape, and interlock means are provided for stopping said second reader and restarting said first reader automatically upon the second reader reading said measure-ending coding.

6. The apparatus as set forth in claim 5 in which the first space increment code of a series of such codes in the tape comprises an interlock code which serves to stop said first reader and await restarting until said second reader has encountered the next measure-ending coding.

7. The apparatus as set forth in claim 5 in which said measure-ending coding includes a code calling for movement of the carriage immediately to the zero point of beginning of the next portion of the copy to be centered.

8. The apparatus as set forth in claim 7 in which said carriage moving code is a carriage return code and is adapted to be encountered by said second reader first in said measure-ending coding to effect carriage return just prior to the transfer of reading to the first reader; whereby the half-space centering escapement to be effected by the next reading by the first reader occurs in a new line of composition.

9. The apparatus as set forth in claim 7 in which said carriage moving code is a tab code and is adapted to be encountered by said second reader first in said measure-ending coding to effect tabular movement of said carriage just prior to the transfer of reading to the first reader; whereby the half-space centering escapement to be effected by the next reading by the first reader occurs in a new column of composition.

10. The apparatus as set forth in claim 9 in which means are provided in the second reader controls for causing it to read certain of said space increment codes itself and escape the carriage incrementally in approaching such tabular movement.

11. In an automatic typographic composing system of the class described, apparatus for automatically preparing centered copy as for headings or columnar texts, said apparatus comprising a recorder which includes a keyboard, a tape code punch for punching both character codes and functional-control codes in a tape in response to operation of said keyboard, a code translator, a code selector, a tape code hole counter, and an escapement recording device; and a reproducer which includes a variable escapement carriage for carrying a medium to receive the composition, a double tape-code-reading device consisting of a first reader primarily for reading functional-control codes, and a second reader primarily for reading character codes, a code translator, a code selector, imprinting means for producing copy on said medium in response to the codes read from the tape, and an escapement effecting element activated to cause incremental escapement of said carriage; said character codes for the copy to be centered adapted to be punched by operation of the keyboard on the recorder first, means normally operable to initiate a continuous automatic translator action and escapement action in the recorder, means activating the hole counter to determine whether the text of the copy has used up a predetermined number of code holes and if necessary to punch feed holes in the tape up to said predetermined number; means operable upon continuing translator escapement action to punch into the tape a repeated unique code, each of said codes representing an escapement of a predetermined even number of space units, up to the end of the area across which the copy is to be centered; sensing means for automatically indicating the imminent approach of the end of said area; means for automatically punching measure-ending coding in the tape, said measure-ending coding comprising a carriage moving code and reader interlock and reader pulsing codes; means for preventing actual carriage movement in the recorder when said carriage moving code is punched in the tape; and means for effecting actual carriage movement in the recorder immediately after completion of the punching of the measure-ending coding without the carriage movement code, into the tape.

12. An apparatus as set forth in claim 11 in which a source of electric current is provided in the recorder and electromagentic means for the activation of the enumerated operative elements appropriately connected and energized from said source by switch controlled circuitry; said electromagnetic means including an automatic-centering relay adapted to be energized by the closing of a centering switch to initiate the translator action of the recorder, to provide a translator output of carriage escapements and to punch a unique code in the tape representative of such escapements, while at the same time actually escaping the carriage of the recorder through the appropriate number of escapements but each escaped increment being of double the actual space units of the increments of the escapements as read from the tape and performed by the reproducer carriage in traversing the area preceding the centered copy.

13. In an automatic typographic composing system of the class described, apparatus for automatically preparing copy as for headings or columnar texts, which apparatus includes a tape controlled reproducer for imprinting the centered copy: a recorder for inscribing such tape with character codes and functional-control codes, said recorder comprising a base frame, a keyboard, a tape-code punch for punching both character and functional-control codes into the tape, a code translator, a code selector, a tape hole counter, and an escapement recording device, a source of mechanical power, a source of electric current, electromagnetic means for actuating the operative elements therein and switch-controlled circuitry connecting said electromagnetic means with said source of current; a punch-on switch for preparing the punch for operation both by keyboarding text and by manual or automatic application of the functional-control codes; a main centering switch adapted to be manually actuated to prepare the circuitry for the automatic centering operation; said hole counter comprising a hole counting magnet adapted to be stepped up to a predetermined hole count; a clutch for operatively connecting said punch with said source of power; a magnet for actuating said clutch; means for energizing said punch clutch magnet; a clutch or operatively connecting said translator with said source of power; a magnet for actuating said translator clutch; and a series of translator code magnets; means actuated by the arrival of said hole count magnet at the predetermined number of holes for energizing the translator clutch magnet and the selected translator code magnet representative of the escapement value associated with the recorder, thus starting the recorder escapement; means altering the punch operating and code selector circuits to punch an escapement coding into the tape represented by the unique centering escapement code; and means for terminating the escapement code punching and for punching measure-ending coding in the tape.

14. The recorder as set forth in claim 13 in which the means for terminating the escapement code punching includes electrical means for sensing the approach of the end of the portion of copy to be centered, and de-energizing the translator clutch magnet and the selected translator code magnet; an electrical delay circuit for inhibiting any further operations in the centering procedure, pending the completion of the last translator cycle, thus terminating the punching of the unique centering escapement code in the tape.

15. The recorder as set forth in claim 14 in which there are provided means for terminating the escapement just prior to the punching of the last unique centering escapement code in the tape, whereby there will be one more of such unique centering escapement codes in the tape than the reproducer carriage will be called upon to heed, thus reserving one of the unique codes for a control or interlock code in the reproducer.

16. The recorder as set forth in claim 15 in which there are provided means for punching a carriage-movement code in the tape by energizing the punch clutch magnet and the appropriate punch code magnets but without energizing the translator magnets, thereby implanting the carriage-moving code in the tape but without actual carriage movement in the recorder.

17. The recorder as set forth in claim 16, in which there is provided an auxiliary code relay which is energized to effect the said energizing of the punch clutch magnet and punch code magnets, and a holding circuit is provided for keeping said relay energized until completion of the mechanical punching cycle.

18. The recorder as set forth in claim 17 in which means are provided for punching interlock and end-of-line control coding in the tape following the punching of the carriage-moving code; and means for actually returning the recorder carriage without punching a code in the tape.

19. The recorder as set forth in claim 13 adapted for centering in or over successive columns of composition, in which said escapement recording device comprises a trial copy carriage, and in which said last named means includes cooperating tab stop contacts on the carriage and the base frame of the recorder adapted to provide a tab stop switch to activate a circuit when the carriage reaches a tab point in its escapement movement; and circuitry including said tab stop switch and the circuitry which includes said centering switch serving to stop said escapement and corresponding coding and initiate the tab code punching operation, if said centering switch has been released before the tab stop switch closes; said tab stop circuitry operable to ensure continuation of the automatic escapement and coding without interruption, if the centering switch is still actuated at the time the tab stop switch closes.

20. The recorder as set forth in claim 13 adapted for centering in or over successive columns of composition in which said escapement recording device comprises a trial copy carriage, and in which said last named means includes cooperating tab stop contacts on the carriage and the base frame of the recorder adapted to provide a tab stop switch to close a circuit when the carriage reaches a tab point in its escapement movement; and circuitry including said tab stop switch and the circuitry which includes said centering switch operable to stop said space increment esecapement and corresponding coding and initiate the tab code punching operation; and means for breaking the circuit to the translator and escapement actuation upon the last translator cycle, whereby one unique escapement code is punched into the tape without actual escapement of the recorder carriage.

21. The recorder as set forth in claim 20 in which means are provided for punching a tab code in the tape without any translator action, after the last unique escapement code has been punched.

22. The recorder as set forth in claim 21 in which means are provided which also breaks the circuit to the translator magnets inhibiting any recorder carriage operation, following the conventional end-of-tab-area coding.

23. The apparatus as set forth in claim 13 in which the word-space increment of the system is of an even number of units, and in which the selected translator code magnet is that one which represents the word-space code.

24. The recorder as set forth in claim 18 in which means are provided for punching justification coding in the tape to produce a justified line of copy in the reproducer, and circuitry energized by a manually actuated switch to effect justified-line-end coding in the same manner as set forth in connection with centering, namely punching the carriage return code without carriage return operation, then punching end-of-line coding including the interlock code and a justification code, then followed by actual carriage return operation.

25. The recorder as set forth in claim 18 in which there are provided means for deleting any columnar centered text, said means including a line-delete circuit, a manually operable switch controlling said circuit, circuitry associated with said line-delete circuit and the aforesaid centering circuitry for preventing a conventional carriage movement accompanying line-delete operation, and means for manually returning the carriage only to the beginning of said columnar text which was to have been deleted.

26. The recorder as set forth in claim 18 in which there are provided a tape-code-reader for reading a coded tape as for the purpose of re-punching in a new tape the composition coding for example, for the correction of an error, and means for accommodating said reader to the handling of text centering coding, wherein a carriage moving code precedes the end-of-measure coding, said means including circuitry which alters the conventional carriage moving code to change it into an arbitrary non-effective code, thus cancelling out the said carriage moving code and preventing movement of the carriage prior to the reading and transcribing of the end-of-measure coding.

27. The recorder as set forth in claim 13 in which there are provided means for punching a carriage-movement code in the tape by energizing the punch clutch magnet and the appropriate punch code magnet but without energizing the translator magnets, thereby implanting the carriage-moving code in the tape but without actual carriage movement in the recorder; means for punching interlock and end-of-line control coding in the tape following the punching of the carriage-moving code; means for actually returning the recorder carriage without punching a code in the tape; and in which means are provided for punching justification coding in the tape to produce a justified line of copy in the reproducer, and circuitry energized by the manually actuated switch to effect justified-line-end coding in the same manner as set forth in connection with centering, namely, punching the carriage return code without carriage return operation, then punching end-of-line coding including the interlock code and a justification code, then followed by actual carriage return operation.

28. The recorder as set forth in claim 13 in which there are provided means for deleting any columnar centered text, said means including a line-delete circuit, a manually operable switch controlling said circuit, circuitry associated with said line-delete circuit and the aforesaid centering circuitry for preventing a conventional carriage movement accompanying line-delete operation, and means for manually returning the carriage only to the beginning of said columnar text which was to have been deleted.

29. The recorder as set forth in claim 13 in which there are provided a tape-code-reader for reading a coded tape as for the purpose of re-punching in a new tape the composition coding for example, for the correction of an error, and means for accommodating said reader to the handling of text centering coding, wherein a carriage moving code precedes the end-of-measure coding, said means including circuitry which alters the conventional carriage moving code to change it into an arbitrary non-effective code, thus cancelling out the said carriage moving code and preventing movement of the carriage prior to the reading and transcribing of the end-of-measure coding.

30. In an automatic typographic composing system of the class described, apparatus for automatically preparing centered copy as for headings or columnar texts, said apparatus including a recorder having means for punching character codes and functional-control codes in a tape, according to the desired composition, the coding for successive centered lines comprising, in order, character codes for the text, a series of unique escapement increment codes corresponding in number to the escapement increments necessary in said recorder to traverse the total extent represented by the difference between the total width over which the text is to be centered and the extent of the text itself, a carriage moving code, and end-of-measure coding, and all of said coding repeated for the next centered composition: a reproducer which includes a carriage for carrying a medium to receive the composition, a double tape-code reading device consisting of a first reader primarily for reading functional-control codes and a second reader primarly for reading character codes, and imprinting means for producing copy on said medium in response to the codes read from the tape, means for imparting incremental escapement to said carriage; means for causing said first reader to start reading upon encountering the first of the unique escapement increment codes and continue until encountering the first of such unique codes of the next succeeding portion of composition to be centered, means operable by the endof-measure coding for causing said first reader to effect the starting of the second reader, means operable by said end-of-measure coding when encountered by said second reader to cause the latter to stop reading and to effect the re-starting of said first reader, and means for effecting carriage movement when said second reader encounters said carriage moving code.

31. The reproducer as set forth in claim 30 in which there are provided means for causing said first reader to proceed without stopping upon arriving at the point of the first unique escapement code only if the second reader has stopped.

32. In an automatic typographic composing system of the class described, apparatus for automatically preparing centered copy as for headings or columnar texts, said apparatus including a recorder having means for punching character codes and functional-control codes in a tape, according to the desired composition, the coding for successive centered lines comprising, in order, character codes for the text, a series of unique escapement increment codes corresponding in number to the escapement increments necessary in said recorder to traverse the total extent represented by the difference between the total width over which the text is to be centered and the extent of the text itself, a carriage return code, and end-of-line coding, and all of said coding repeated for the next centered composition: a reproducer which includes a carriage for carrying a medium to receive the composition, a double tape-code reading device consisting of a first reader primarily for reading functional-control codes and a second reader primarily for reading character codes, and impinting means for producing copy on said medium in response to the codes read from the tape, means for imparting incremental escapement to said carriage; means for causing said first reader to start reading upon encountering the first of the unique escapement increment codes and continue until encountering the first of such unique codes of the next succeeding line to be centered, means operable by the end-of-line coding for causing said first reader to effect the starting of the second reader, means operable by said end-of-line coding when encountered by said second reader to cause the latter to stop reading and to effect the re-starting of said first reader, and means for effecting carriage return when said second reader encounters said carriage return code, and means for causing said first reader to proceed without stopping upon arriving at the point of the first unique escapement code only if the second reader has stopped.

33. In an automatic typographic composing system of the class described, apparatus for automatically preparing centered copy as for headings or columnar texts, said apparatus including a recorder having means for punching character codes and functional-control codes in a tape, according to the desired composition, the coding for successive centered lines comprising, in order, character codes for the text, a series of unique escapement increment codes corresponding in number to the escapement increments necessary in said recorder to traverse the total extent represented by the difference between the total width over which the text is to be centered and the extent of the text itself, a tab code, and end-of-column coding, and all of said coding repeated for the next centered composition: a reproducer which includes a carriage for carrying a medium to receive the composition, a double tape-code reading device consisting of a first reader primarily for reading functional-control codes and a second reader primarily for reading character codes, and imprinting means for producing copy on said medium in response to the codes read from the tape, means for imparting incremental escapement to said carriage; means for causing said first reader to start reading upon encountering the first of the unique escapement increment codes and continue until encountering the first of such unique codes of the next succeeding column to be centered, means operable by the end-of-column coding for causing said first reader to effect the starting of the second reader, means operable by said end-of-column coding when encountered by said second reader to cause the latter to stop reading and to effect the re-starting of said first reader, and means for effecting tabbing when said second reader encounters said tab code, and means for causing said first reader to proceed without stopping upon arriving at the point of the first unique escapement code only if the second reader has stopped.

34. The reproducer as set forth in claim 30 in which means are provided in said reproducer to cause the first reader to read the unique escapement increment codes and effect escapement of the carriage through a distance equal to one-half of the total extent of the incremental escapement, before the second reader starts reading and transcribing the text character codes.

35. In an automatic typographic composing system of the class described, apparatus for automatically preparing centered copy as for heading or columnar texts, said apparatus including a recorder having means for punching character codes and functional-control codes in a tape, according to the desired composition, the coding for successive centered lines comprising, in order, character codes for the text, a series of unique escapement increment codes corresponding in number to the escapement increments necessary in said recorder to traverse the total extent represented by the difference between the total width over which the text is to be centered and the extent of the text itself, a carriage moving code, and end-of-measure coding, and all of said coding repeated for the next centered composition: a reproducer which includes a carriage for carrying a medium to receive the composition, a double tape-code reading device consisting of a first reader primarily for reading functional-control codes and a second reader primarily for reading character codes, and imprinting means for producing copy on said medium in response to the codes read from the tape, means for imparting incremental escapement to said carriage; a source of electric current in said reproducer and electromagnetic means for the activation of the enumerated operative elements appropriately connected and energized from said source by switch-controlled circuitry; means for utilizing said same unique code for the accomplishment of two functions, said last named means including circuitry which upon reading the first of said unique codes in the series establishes a condition in the circuitry which causes the reading of each subsequent unique code in said series to escape said carriage.

36. The reproducer as set forth in claim 35 in which said last named means includes a relay which is adapted to actuate the escapement imparting means for yielding one increment of escapement of the carriage; a second relay adapted to inhibit the escapement function of said first named relay until the completion of the reading of the first unique code in said series, whereupon said second relay permits said first relay to respond to the reading of each subsequent unique code in the series to effect an increment of escapement of the carriage.

37. The reproducer as set forth in claim 35 in which there are provided two relays connected in series in an electric circuit, the first of said relays serving when energized to actuate said carriage escapement imparting means, the remote terminal of the second of said relays connected to a source of current of one sign, the remote terminal of said first named relay connected to the source of current of the opposite sign through a switch adapted to be closed by the energizing of said second named relay, means supplying current of said opposite sign to the last named circuit at a point between said relays upon and during the reading of the first unique code of the series, thus energizing said second relay and closing said switch, said last named means effecting the neutralization of said first named relay, the completion of the reading of said first unique code serving to disconnect the supply of current of said opposite sign to said point between said relays, and thus permitting both relays to be energized and to cause the first named relay to effect escapement upon the reading of subsequent unique codes of said series.

38. In an automatic typographic composing system of the class described, apparatus for automatically preparing centered copy as for columnar texts, said apparatus including a recorder having means for punching character codes and functional-control codes in a tape, according to the desired composition, the coding for successive centered portions of text comprising, in order, character codes for the text, a series of unique escapement increment codes corresponding in number to the escapement increments necessary in said recorder to traverse the total extent represented by the difference between the total width of column over which the text is to be centered and the extent of the text itself, a tab code, and end-of-measure coding, and all of said coding repeated for the next centered composition: a reproducer which includes a carriage for carrying a medium to receive the composition, a double tape-code reading device consisting of a first reader primarily for reading functional-control codes and a second reader primarily for reading character codes, and imprinting means for producing copy on said medium in response to the codes read from the tape, means for imparting incremental escapement to said carriage, a source of electric current in the reproducer and electromagnetic means for the activation of the enumerated operative elements appropriately connected and energized from said source by switch controlled circuitry; means for causing said first reader to start reading said series of unique escapement increment codes and effecting the desired carriage escapement preceding the text to be centered, means actuated by the first reader upon completion of its reading of the measure across which the text is to be centered to initiate the reading of the tape coding by the second reader, beginning with the character codes of the text, means actuated upon the reading of the first unique code of the series by said second reader to prepare circuitry for properly leading up to the end of the tabular measure, and means for activating a counting circuit upon each reading of the next predetermined number of succeeding unique codes, whereupon the reading of unique codes beyond said predetermined number each effects an operation of said incremental escapement imparting means to escape the carriage up to said end of tabular meassure.

39. In an automatic typographic composing system of the class described, apparatus for automatically preparing centered copy as for headings or columnar texts, said apparatus comprising a recorder which is adapted to punch character codes and functional-control codes in a tape, and a reproducer adapted to be operated by said tape to effect said composition, said recorder comprising a base frame, a keyboard, a tape-code punch for punching both character and functional-control codes into the tape, a code translator, a code selector, a tape hole counter, and an escapement recording device, a source of mechanical power, a source of electric current, electromagnetic means for actuating the operative elements therein and switch-controlled circuitry connecting said electromagnetic means with said source of current; a punch-on switch for preparing the punch for operation both by keyboarding text and by manual or automatic application of the functional-control codes; a main centering switch adapted to be manually actuated to prepare the circuitry for the automatic centering operation; said hole counter comprising a hole counting magnet adapted to be stepped up to a predetermined hole count; a clutch for operatively connecting said punch with said source of power; a magnet for actuating said clutch; means for energizing said punch clutch magnet; a clutch for operatively connecting said translator with said source of power; a magnet for actuating said translator clutch; and a series of translator code magnets; means actuated by the arrival of said hole count magnet at the predetermined number of holes for energizing the translator clutch magnet and the selected translator code magnet representative of the escapement value associated with the recorder, thus starting the recorder escapement; means altering the punch operating and code selector circuits to punch an escapement coding into the tape represented by the unique centering escapement code; and means for terminating the escapement code punching and for punching measure-ending coding in the tape; said reproducer comprising a variable escapement carriage for carrying a medium to receive the composition, a double tape-code reading device consisting of a first reader primarily for reading functional-control codes and a second reader primarily for reading character codes, and imprinting means for producing copy on said medium in response to the codes read from the tape, means for imparting incremental escapement to said carriage, a source of electric current in the reproducer and electromagnetic means for the activation of the enumerated operative elements appropriately connected and energized from said source by switch controlled circuitry; means for causing said first reader to start reading said series of unique escapement increment codes and effecting the desired carriage escapement preceding the text to be centered, means actuated by the first reader upon completion of its reading of the measure across which the text is to be centered to initiate the reading of the tape coding by the second reader, beginning with the character codes of the text, means actuated upon the reading of the first unique code of the series by said second reader to prepare circuitry for properly leading up to the end of the tabular measure, and means for activating a counting circuit upon each reading of the next predetermined number of succeeding unique codes, whereupon the reading of unique codes beyond said predetermined number each effects an operation of said incremental escapement imparting means to escape the carriage up to said end of tabular measure.

40. The method of composing centered copy as for headings or columnar texts, by the use of a recorder instrumentality which is adapted to punch character codes and functional-control codes in a tape, and a reproducer instrumentality adapted to be operated by said tape to effect said composition, said method comprising first punching character codes into the tape, then punching coding corresponding to the extent of total blank space representing the difference in extent of the line of text and the total extent of the area across which the text is to be centered; applying said tape to said reproducer instrumentality; interpreting the last named coding in the tape to reduce the extent of space represented by said coding by one-half, and imparting an escapement to said reproducer instrumentality of such reduced extent prior to the reading of the character coding, and imprinting of the text.

41. The method of composing centered copy as for headings or columnar texts, by the use of a recorder instrumentality which is adapted to punch character codes and functional-control codes in a tape, and a reproducer instrumentality adapted to be operated by said tape to effect said composition, said method comprising first punching character codes into the tape, then punching a series of unique carriage escapement codes in the tape, each representative of an increment of escapement of an even number of units, and in all equal to the extent of total blank space being the difference between the extent of the whole area across which the text is to be centered and the extent of the text itself; applying said tape to the reproducer instrumentality; reading said unique escapement codes, reducing the effective value of each by one-half, and imparting escapement to the reproducer instrumentality to the extent of the total number of halved-increment values, prior to reading said character codes and imprinting the text.

References Cited by the Examiner

UNITED STATES PATENTS

| 2,848,049 | 8/1959 | Robbins et al. | 234—7 |
| 3,056,545 | 10/1962 | Donahue et al. | 234—4 |
| 3,171,592 | 3/1965 | Hanson | 234—7 |

WILLIAM S. LAWSON, *Primary Examiner.*